United States Patent
Dedrickson

(10) Patent No.: US 9,975,184 B2
(45) Date of Patent: May 22, 2018

(54) CHUCK ASSEMBLY FOR A ROTARY POWER TOOL

(71) Applicant: MILWAUKEE ELECTRIC TOOL CORPORATION, Brookfield, WI (US)

(72) Inventor: Ryan Allen Dedrickson, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days. days.

(21) Appl. No.: 15/478,560

(22) Filed: Apr. 4, 2017

(65) Prior Publication Data

US 2017/0203372 A1    Jul. 20, 2017

Related U.S. Application Data

(63) Continuation of application No. 14/697,948, filed on Apr. 28, 2015, now Pat. No. 9,643,258.

(Continued)

(51) Int. Cl.
  *B23B 31/12*   (2006.01)
  *B25D 16/00*   (2006.01)
  *B25D 17/00*   (2006.01)

(52) U.S. Cl.
  CPC ...... *B23B 31/1238* (2013.01); *B23B 31/1215* (2013.01); *B23B 2231/0276* (2013.01);
  (Continued)

(58) Field of Classification Search
  CPC ............ B23B 31/1238; B23B 31/1215; B23B 2231/026; B23B 2231/0276;
  (Continued)

(56) References Cited

U.S. PATENT DOCUMENTS

| 2,395,228 A | 2/1946 | Lininger |
| 3,000,642 A | 9/1961 | Kawasaki |

(Continued)

FOREIGN PATENT DOCUMENTS

DE    4342765    6/1995

OTHER PUBLICATIONS

Machine translation, Description of German Patent document, DE 4342765, Hans-Dieter, M., Dec. 1993.

*Primary Examiner* — Eric A Gates
*Assistant Examiner* — Chwen-Wei Su
(74) *Attorney, Agent, or Firm* — Michael Best & Friedrich LLP

(57) ABSTRACT

A method of operating a power tool chuck assembly includes inserting a tool bit within a central bore of a chuck body, displacing a plurality of jaws with the tool bit from an extended position to a retracted position, displacing the jaws from the retracted position toward the extended position with a spring, rotating a tightening sleeve about a rotational axis in a tightening direction, thereby imparting an axial displacement to the tightening sleeve relative to the chuck body, inwardly displacing a plurality of clamping nuts in a radial direction in response to engagement between a wedge defined on the tightening sleeve and the clamping nuts, causing respective threads on the clamping nuts and the jaws to engage, and applying a clamping force on the tool bit with the jaws in response to continued rotation of the tightening sleeve in the tightening direction.

20 Claims, 21 Drawing Sheets

Related U.S. Application Data

(60) Provisional application No. 61/985,285, filed on Apr. 28, 2014, provisional application No. 61/984,994, filed on Apr. 28, 2014.

(52) U.S. Cl.
CPC . *B23B 2260/136* (2013.01); *B23B 2260/1388* (2013.01); *B23B 2260/146* (2013.01); *B25D 16/006* (2013.01); *B25D 17/005* (2013.01); *B25D 2216/0084* (2013.01); *B25D 2217/003* (2013.01); *Y10S 279/902* (2013.01); *Y10T 29/49826* (2015.01); *Y10T 279/17632* (2015.01); *Y10T 279/32* (2015.01)

(58) Field of Classification Search
CPC ...... B23B 2231/0264; B23B 2260/136; B23B 2260/1388; B23B 2260/138; B23B 2260/146; Y10T 279/17632; Y10T 279/32; Y10T 279/17623; Y10T 279/17615; Y10T 279/17658; Y10S 279/902; B25D 16/006; B25D 17/005; B25D 2216/0084; B25D 2217/003; B25D 2217/0046
See application file for complete search history.

(56) References Cited

U.S. PATENT DOCUMENTS

| | | | |
|---|---|---|---|
| 3,210,088 A | 10/1965 | Williamson et al. | |
| 3,244,428 A | 4/1966 | Röhm | |
| 3,599,999 A | 8/1971 | Schnizler et al. | |
| 3,970,323 A | 7/1976 | Schnizler, Jr. | |
| 4,103,914 A | 8/1978 | Röhm | |
| 4,284,285 A * | 8/1981 | Futter | B23B 31/1207 279/140 |
| 4,317,578 A | 3/1982 | Welch | |
| 4,381,116 A | 4/1983 | Futter | |
| 4,575,108 A | 3/1986 | Whitehead | |
| 4,660,841 A | 4/1987 | Chouinard | |
| 4,848,779 A | 7/1989 | Wheeler et al. | |
| 4,880,246 A | 11/1989 | Röhm | |
| 4,991,859 A | 2/1991 | Röhm | |
| 5,174,588 A | 12/1992 | Reibetanz et al. | |
| 5,435,578 A | 7/1995 | Röhm | |
| 5,443,275 A | 8/1995 | Knobl et al. | |
| 5,476,273 A | 12/1995 | Shadeck et al. | |
| 5,624,125 A | 4/1997 | Röhm | |
| 5,732,956 A | 3/1998 | Huff et al. | |
| 5,918,887 A | 7/1999 | Miles | |
| 6,068,266 A | 5/2000 | Barton et al. | |
| 6,241,260 B1 * | 6/2001 | Judge | B23B 31/1253 279/60 |
| 6,260,857 B1 * | 7/2001 | Wienhold | B23B 31/1238 279/140 |
| 6,505,840 B2 | 1/2003 | Huggins et al. | |
| 6,533,291 B2 | 3/2003 | Huggins et al. | |
| 6,536,782 B2 | 3/2003 | Röhm | |
| 6,540,236 B2 | 4/2003 | Aultman et al. | |
| 6,540,237 B1 | 4/2003 | Temple-Wilson | |
| 6,637,756 B2 | 10/2003 | McCurry | |
| 6,648,342 B2 | 11/2003 | Aultman et al. | |
| 6,669,207 B2 | 12/2003 | Huff et al. | |
| 6,722,668 B2 | 4/2004 | Huggins et al. | |
| 7,328,924 B2 | 2/2008 | Moilanen et al. | |
| 7,360,770 B2 | 4/2008 | Luckenbaugh et al. | |
| 7,832,965 B2 | 11/2010 | MacK | |
| 8,387,719 B2 | 3/2013 | Scrimshaw et al. | |
| 2006/0055126 A1 | 3/2006 | Nachev | |
| 2006/0097462 A1 | 5/2006 | Moilanen et al. | |
| 2006/0186609 A1 | 8/2006 | Baumann et al. | |
| 2007/0060030 A1 | 3/2007 | Pollak et al. | |
| 2008/0143062 A1 | 6/2008 | Mack | |
| 2011/0024997 A1 | 2/2011 | Yaksich | |
| 2012/0175849 A1 | 7/2012 | Mack | |
| 2012/0256380 A1 | 10/2012 | Thorson et al. | |
| 2012/0274035 A1 | 11/2012 | Schenk | |
| 2013/0180745 A1 | 7/2013 | Scrimshaw et al. | |
| 2013/0320637 A1 * | 12/2013 | Zhang | B23B 31/06 279/112 |

* cited by examiner

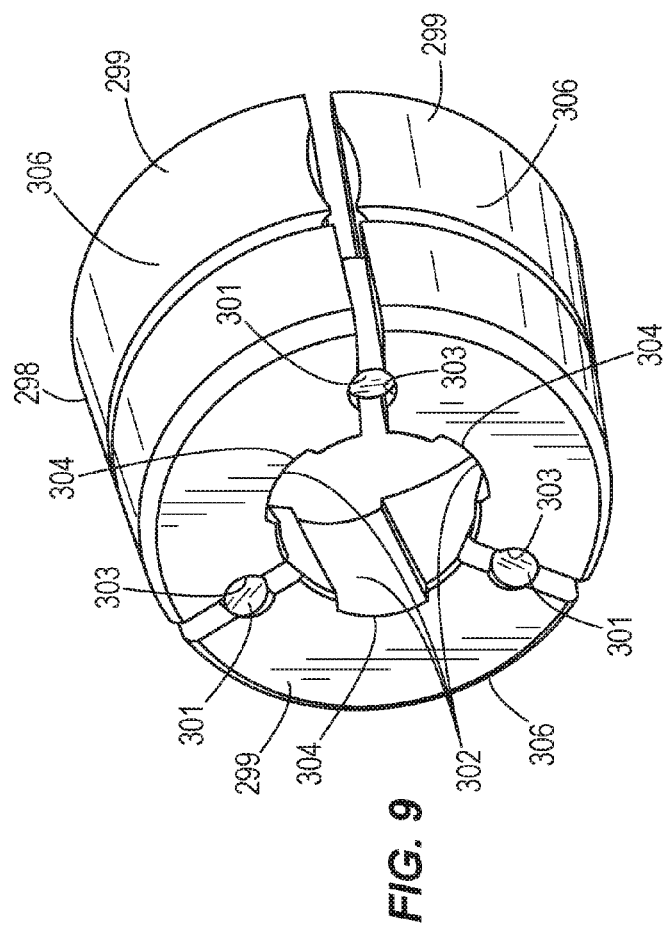
FIG. 9
FIG. 10
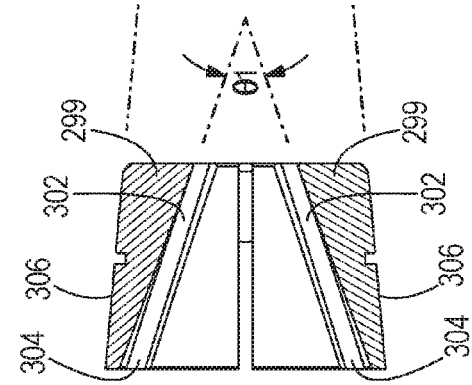

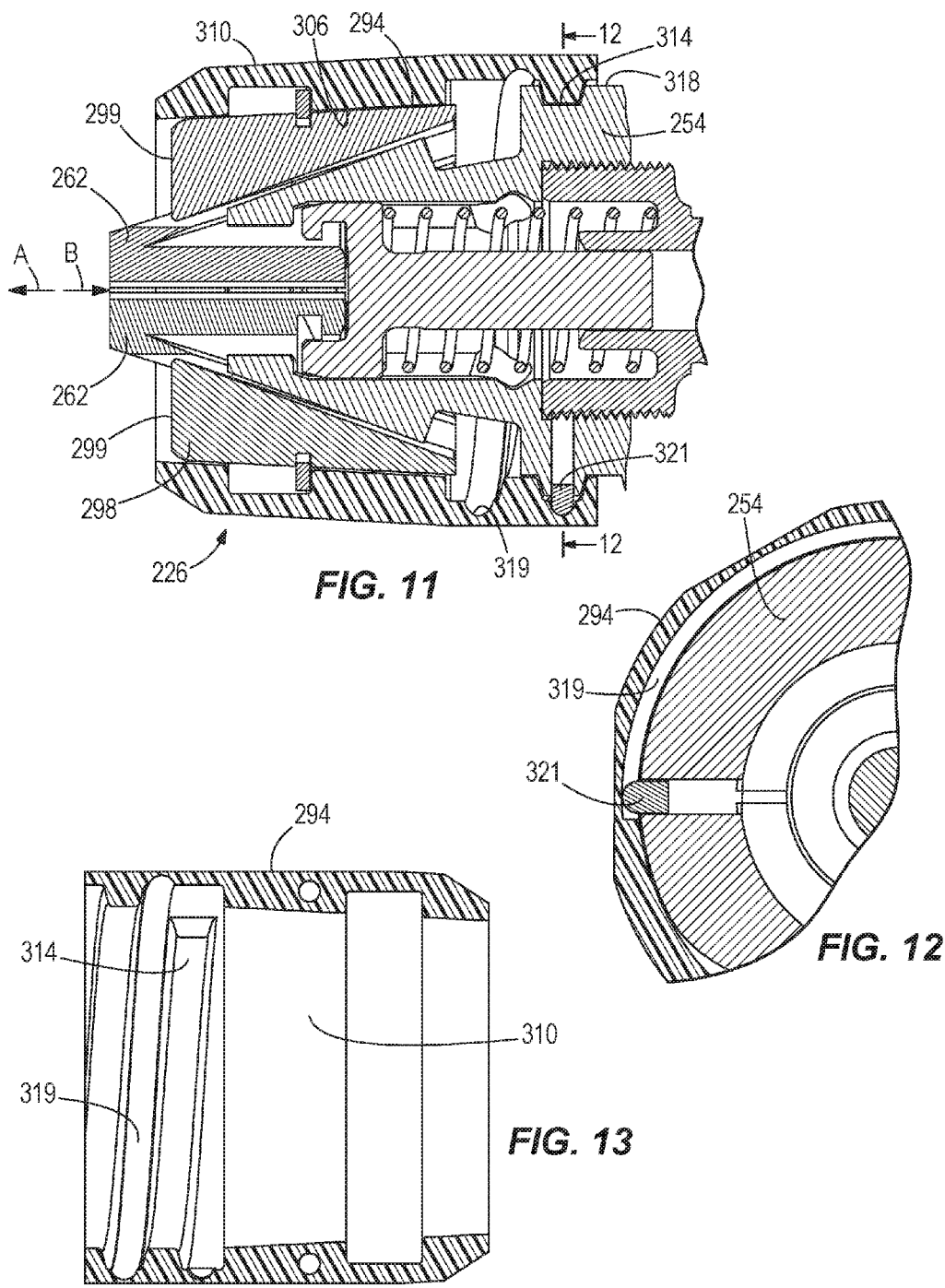

CHUCK ASSEMBLY FOR A ROTARY POWER TOOL

CROSS-REFERENCE TO RELATED APPLICATIONS

This application is a continuation of U.S. patent application Ser. No. 14/697,948 filed Apr. 28, 2015, now U.S. Pat. No. 9,643,258, which claims priority to U.S. Provisional Patent Application Nos. 61/985,285 and 61/984,994, both filed on Apr. 28, 2014, the entire contents of all of which are incorporated herein by reference.

FIELD OF THE INVENTION

The present invention relates to power tools, and more particularly to chuck assemblies for rotary power tools.

BACKGROUND OF THE INVENTION

Power tools having a rotational output (i.e. rotary power tools) typically include chuck assemblies having a plurality of jaws that are adjustable to grip and secure a tool element (e.g., a drill bit).

SUMMARY OF THE INVENTION

The invention provides, in one aspect, a method of operating a chuck assembly for use with a rotary power tool. The method includes inserting a tool bit within a central bore of a chuck body, the bore defining a rotational axis, displacing a plurality of jaws with the tool bit from an extended position to a retracted position during insertion of the tool bit within the central bore, displacing the jaws from the retracted position toward the extended position after insertion of the tool bit within the central bore with a spring, rotating a tightening sleeve about the rotational axis in a tightening direction, thereby imparting an axial displacement to the tightening sleeve relative to the chuck body, inwardly displacing a plurality of clamping nuts in a radial direction in response to engagement between a wedge defined on the tightening sleeve and the clamping nuts, causing respective threads on the clamping nuts and the jaws to engage, and applying a clamping force on the tool bit with the jaws in response to continued rotation of the tightening sleeve in the tightening direction.

Other features and aspects of the invention will become apparent by consideration of the following detailed description and accompanying drawings.

BRIEF DESCRIPTION OF THE DRAWINGS

FIG. 9 is a perspective view of a wedge of the chuck assembly of FIG. 7.

FIG. 10 is a cross-sectional view of the wedge of FIG. 9.

FIG. 11 is another cross-sectional view of the chuck assembly of FIG. 7.

FIG. 12 is another cross-sectional view of the chuck assembly of FIG. 7.

FIG. 13 is a cross-sectional view of a tightening sleeve of the chuck assembly of FIG. 7.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
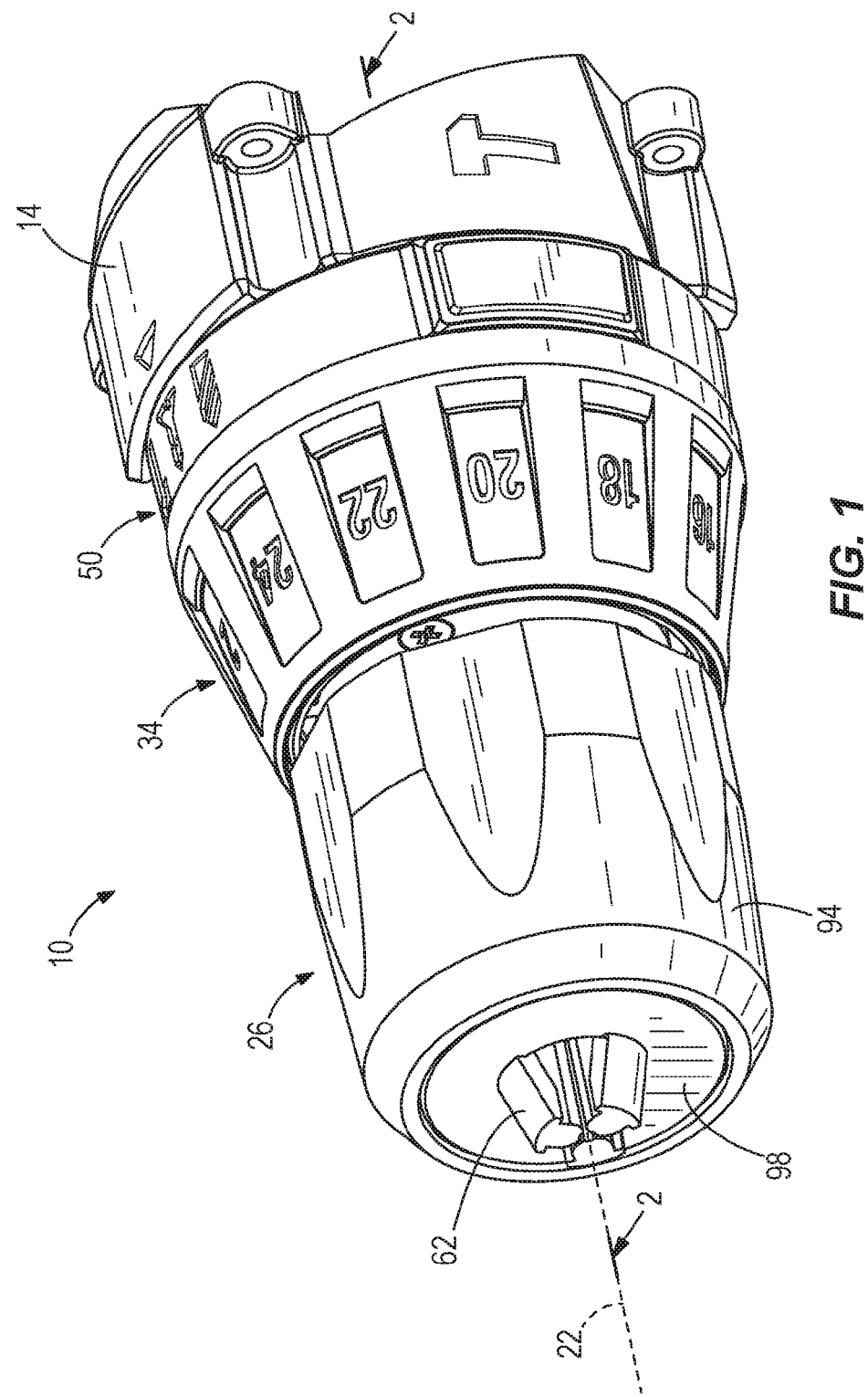
FIG. 1 is a perspective view of a front end assembly of a power tool including a chuck assembly according to an embodiment of the invention.
Figure 5:
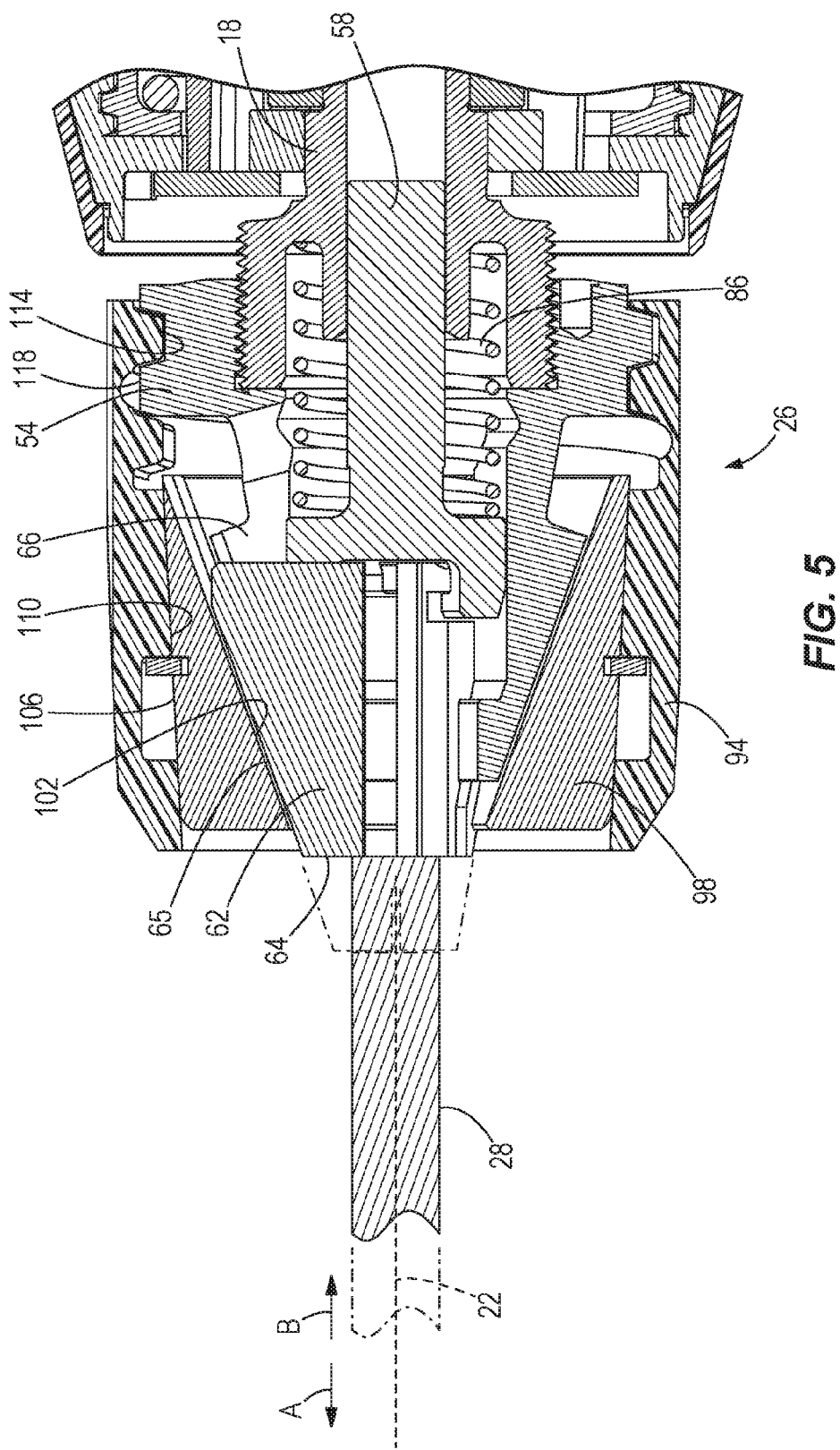
FIG. 5 is a cross-sectional view of the front end assembly of FIG. 1, illustrating a tool bit being inserted within the chuck assembly.
Figure 6:
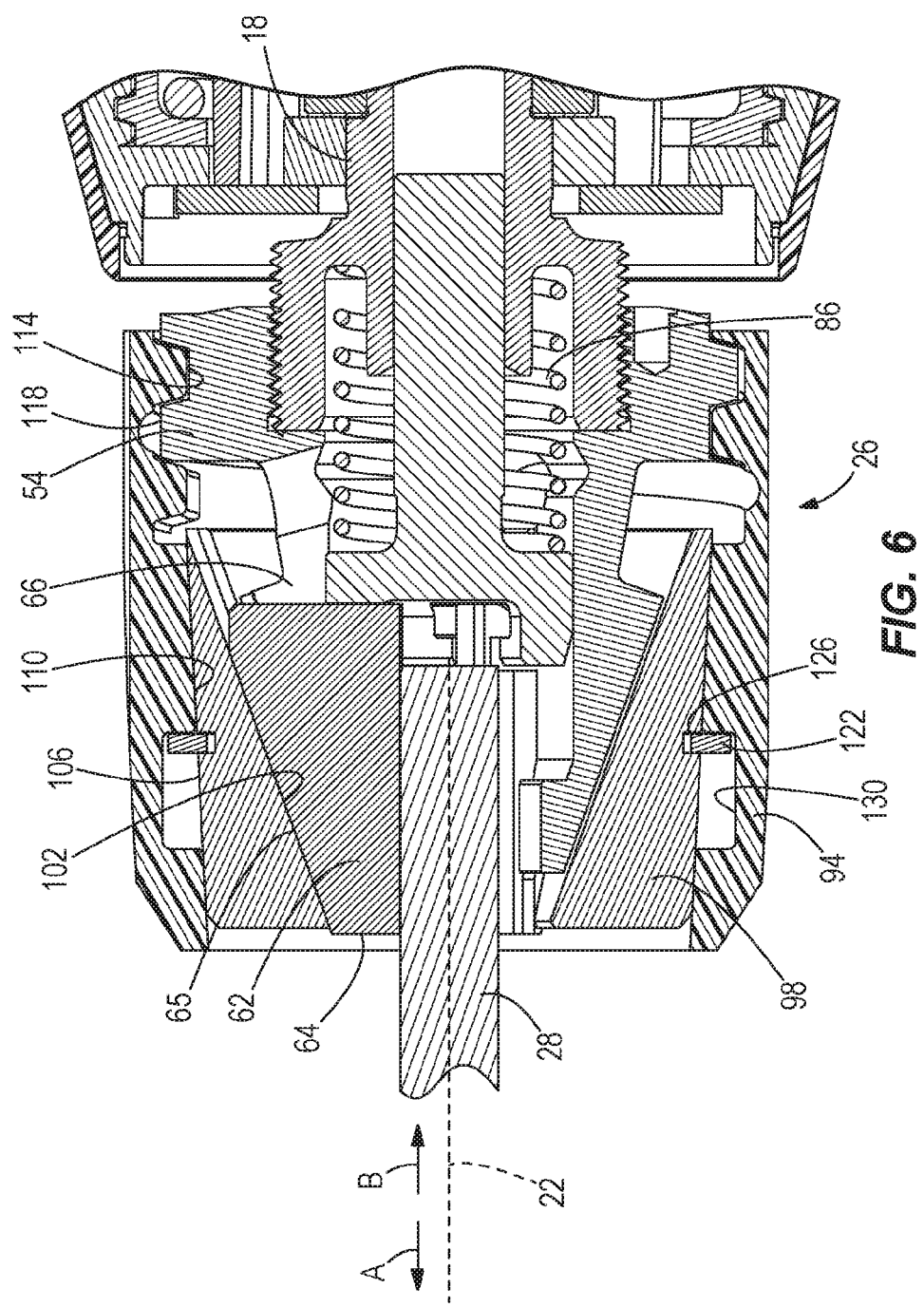
FIG. 6 is a cross-sectional view of the front end assembly of FIG. 1, illustrating the tool bit fully inserted within the chuck assembly.

FIG. 1 illustrates a front end assembly 10 for use with a rotary power tool (e.g., a hammer drill, etc., not shown). The front end assembly 10 includes a housing 14, a spindle 18 (FIG. 2) supported within the housing 14 and rotatable about a central axis 22, and a chuck assembly 26 for selectively receiving and retaining a tool bit 28 (FIGS. 5 and 6). The spindle 18 is coupled to an output 30 of a transmission (not shown), such as a multi-speed, planetary transmission, and receives torque from an electric motor (not shown) of the rotary power tool. In the illustrated embodiment, an adjustable clutch mechanism 34 (FIGS. 1 and 2) selectively limits the amount of torque that may be transferred from the transmission to the spindle 18.

Figure 2:
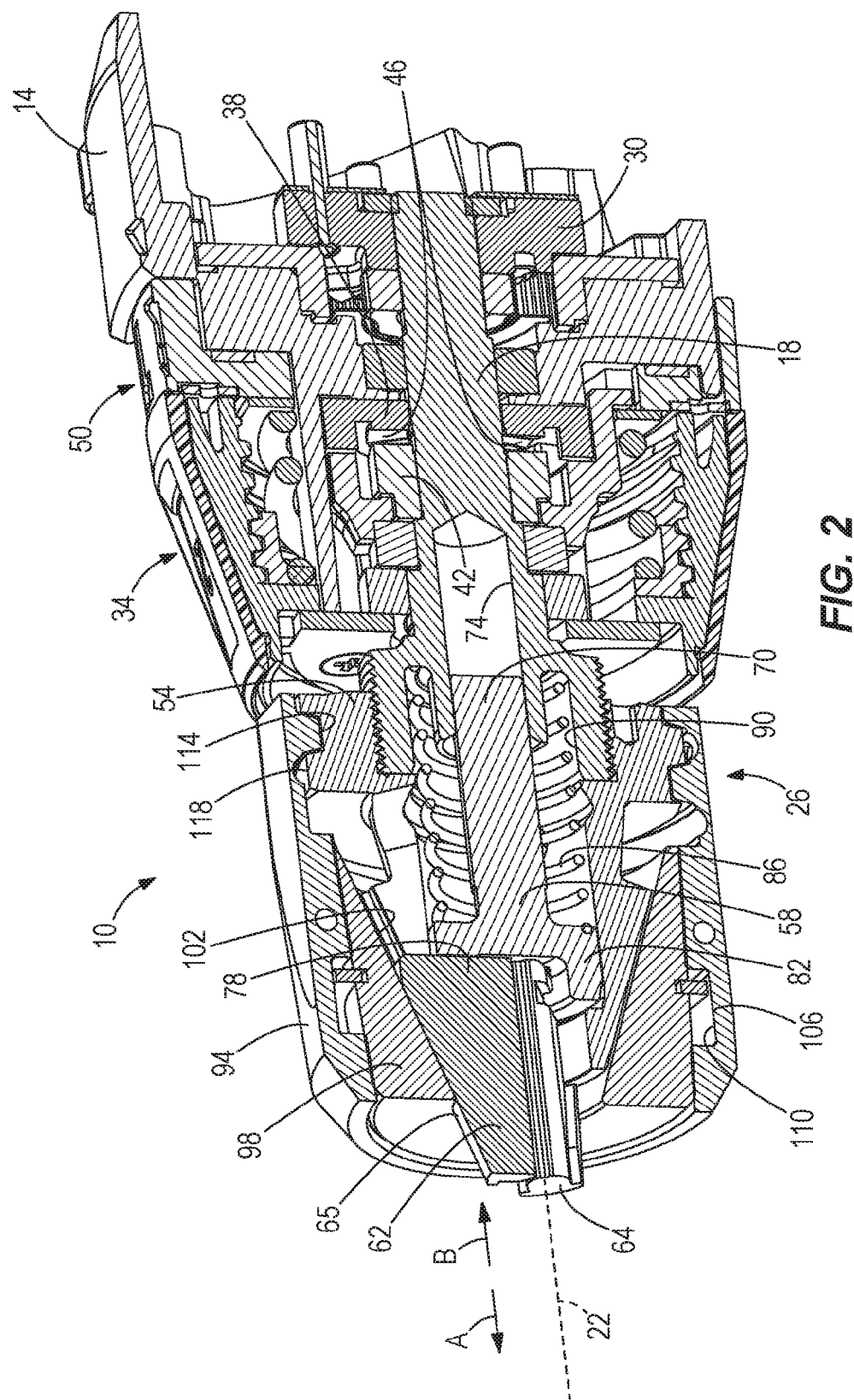
FIG. 2 is a cross-sectional view of the front end assembly of FIG. 1.

With reference to FIG. 2, the front end assembly 10 further includes a fixed ratchet 38 secured within the housing 14 and a rotatable ratchet 42 fixed for co-rotation with the spindle 18 in any of a number of different ways (e.g., by using an interference fit, welding, etc.). The ratchets 38, 42 are engageable in response to the spindle 18 being axially displaced rearward against the biasing force of a spring (not shown) when the rotary power tool is used, for example, in a hammer-drilling operation. Each of the ratchets 38, 42 includes teeth 46 that are engageable and slidable relative to each other in response to relative rotation between the ratchets 38, 42. As the teeth 46 on the rotatable ratchet 42 slide over the teeth 46 of the fixed ratchet 38, the contour of the teeth 46 impart reciprocation (i.e., "hammering") to the spindle 18 to thereby assist the drilling operation. In some embodiments, the spindle 18 may not be reciprocable and the ratchets 38, 42 may be omitted. Alternatively, other mechanisms for imparting reciprocation to the spindle 18 may be employed.

A mode selector 50, such as a mode selector ring, may be provided to selectively prevent the ratchets 38, 42 from engaging and imparting hammering action to the spindle 18. The mode selector 50 may also selectively enable and disable the clutch mechanism 34. In the illustrated embodiment, the mode selector 50 is rotatable between a plurality of positions corresponding with a driving mode, a drilling mode, and a hammer-drilling mode. In other embodiments, the mode selector 50 may be a lever, button, dial, or any other mechanism.

Figure 3:
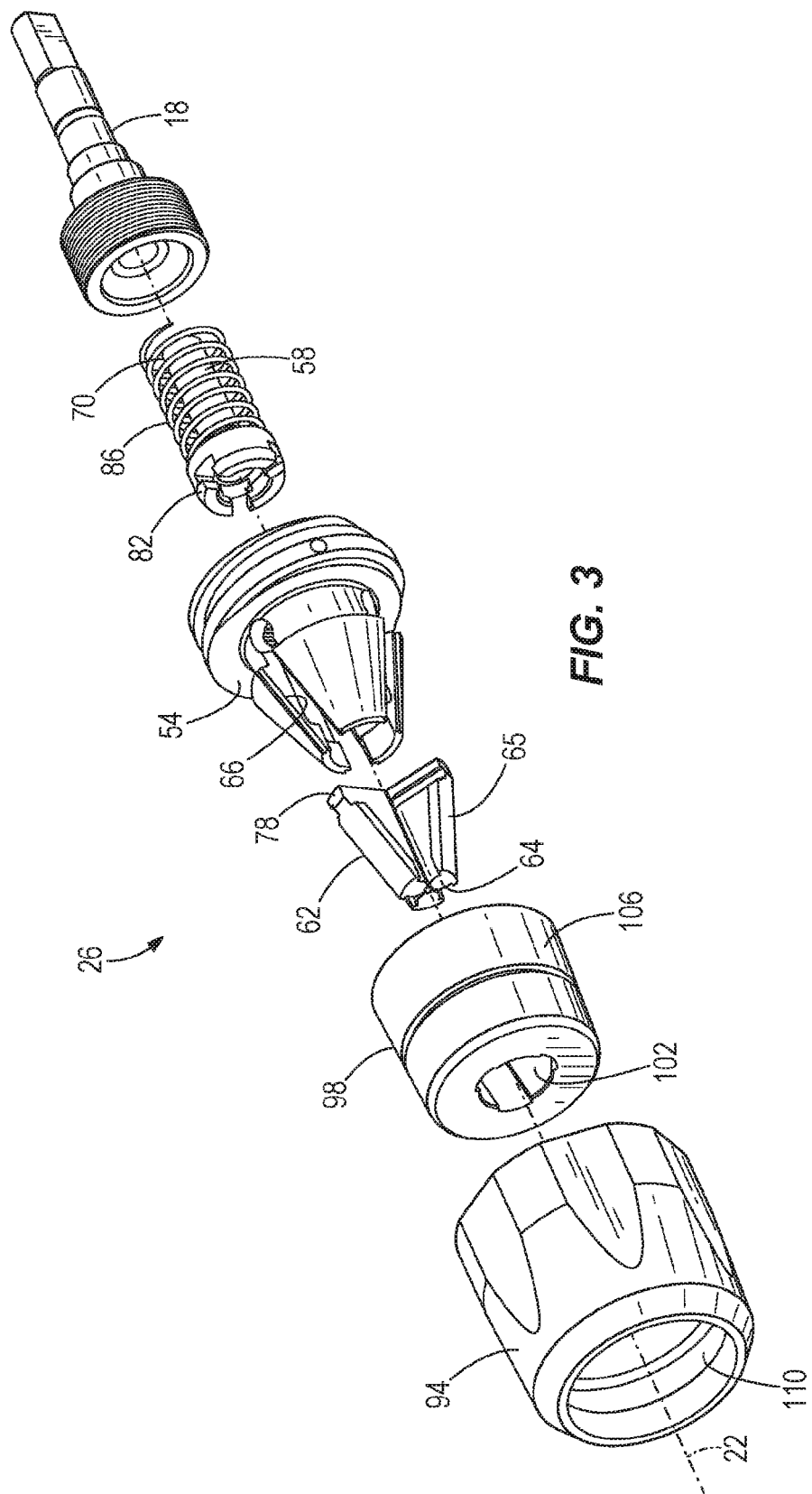
FIG. 3 is an exploded view of the chuck assembly of FIG. 1.

Referring to FIG. 3, the chuck assembly 26 includes a chuck body 54 coupled for co-rotation with the spindle 18, a pusher 58 received within the chuck body 54, and a plurality of jaws 62, each having a front portion or tip 64 and an oblique outer surface 65 extending rearward from the tip 64. In the illustrated embodiment, the chuck assembly 26 includes three jaws 62; however, the chuck assembly 26 may include any number of jaws 62. The chuck body 54 includes slots 66 in which the respective jaws 62 are received. Each of the slots 66 is oriented at an oblique angle relative to the central axis 22.

Referring to FIG. 2, a shank 70 of the pusher 58 is slidably received within an axial bore 74 of the spindle 18. Rear portions 78 of the respective jaws 62 are keyed to a front end portion 82 of the pusher 58 such that the jaws 62 are coupled for axial movement and co-rotation with the pusher 58 but are radially movable relative to the pusher 58. A biasing member or coil spring 86 is disposed between the spindle 18 and the front end portion 82 of the pusher 58 to bias the pusher 58 (and therefore the jaws 62) forward, in the direction of arrow A. Accordingly, the spring 86 maintains the jaws 62 in an extended position, illustrated in FIG. 2, when there is no tool bit 28 between the jaws 62. In the illustrated embodiment, a rear end of the coil spring 86 is received within an annular recess 90 formed in the spindle 18 to stabilize the end of the spring 86.

Figure 4:
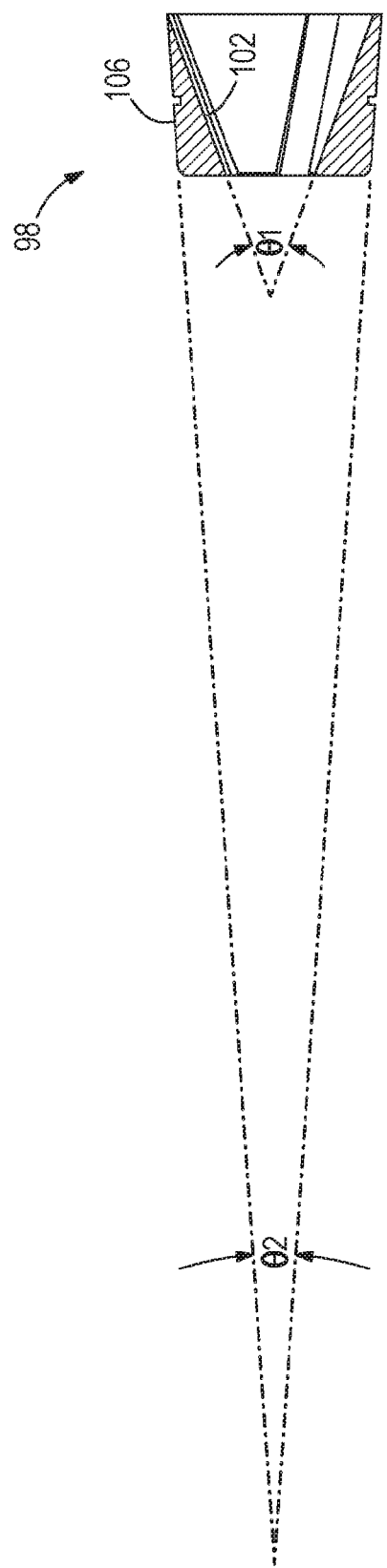
FIG. 4 is a cross-sectional view of a wedge of the chuck assembly of FIG. 1.

The chuck assembly 26 further includes a tightening sleeve 94 surrounding the chuck body 54 and a wedge 98 disposed between the tightening sleeve 94 and the jaws 62 (FIGS. 2 and 3). The wedge 98 has a frusto-conical interior surface 102 engageable with the outer surfaces 65 of the jaws 62 and a frusto-conical exterior surface 106 engageable with a corresponding frusto-conical interior clamping surface 110 of the tightening sleeve 94. The interior surface 102 of the wedge 98 defines a first included angle θ1, and the exterior surface 106 of the wedge 98 defines a second included angle θ2 that is less than the first angle θ1 (FIG. 4). As described in greater detail below, this geometry enables the chuck assembly 26 to exert a relatively large clamping force on the tool bit 28 while maintaining a relatively compact size.

The tightening sleeve 94 has internal threads 114 engaged with external threads 118 of the chuck body 54 (FIG. 2). Accordingly, rotation of the tightening sleeve 94 relative to the chuck body 54 in a first or tightening direction causes axial displacement of the tightening sleeve 94 along the chuck body 54 in the direction of arrow B, thereby applying a clamping force to the jaws 62 through the wedge 98. Conversely, rotation of the tightening sleeve 94 relative to the chuck body 54 in a second or loosening direction causes axial displacement of the tightening sleeve 94 along the chuck body 54 in the direction of arrow A. In some embodiments, the threads 114, 118 may have a pitch between about 4 millimeters and about 12 millimeters. In the illustrated embodiment, the threads have a pitch of about 8 millimeters, such that a quarter turn (i.e. a 90 degree rotation) of the tightening sleeve 94 relative to the chuck body 54 causes the tightening sleeve 94 to translate 2 millimeters along the chuck body 54.

With reference to FIGS. 2 and 4, the wedge 98 resolves an axial force, resulting from axial displacement of the sleeve 94, into a normal or clamping force exerted by each of the jaws 62 on the tool bit 28. In general, the smaller the included angles θ1 and θ2, the greater the clamping force exerted on the tool bit 28. However, the wedge 98 also governs the rate at which the jaws 62 converge on the axis 22 as the jaws 62 and the pusher 58 move from a retracted position toward the extended position illustrated in FIG. 2. A relatively steep angle θ1 allows for a shorter, more compact chuck assembly 26. In other words, the greater the first included angle θ1, the less axial distance is required for the jaws 62 to fully extend or retract. Therefore, a tradeoff exists between the developed clamping force and the length of the chuck assembly 26.

In the illustrated embodiment, the first included angle θ1 is about 40 degrees, and the second included angle θ2 is about 18 degrees. It has been found through extensive design, calculations, and testing that this geometry provides a relatively large clamping force while maintaining a compact length of the chuck assembly 26. In other embodiments, the first included angle θ1 may be between about 30 degrees and about 50 degrees, and the second included angle θ2 may be between about 10 degrees and about 30 degrees. In yet other embodiments, the second included angle θ2 may be between about 2 degrees and about 10 degrees.

In the illustrated embodiment, a retaining ring 122 (e.g., a C-ring) is received within a groove 126 formed in the exterior surface 106 of the wedge 98, and the tightening sleeve 94 includes an annular recess 130 that surrounds the retaining ring 122 (FIG. 6). As the tightening sleeve 94 moves in the direction of arrow A, a rear wall of the recess 130 bears against the retaining ring 122. This causes the wedge 98 to move with the sleeve 94, thereby releasing the clamping force applied to the jaws 62 through the wedge 98.

With reference to FIGS. 5 and 6, to secure a tool bit 28 within the chuck assembly 26, a user pushes the tool bit 28 against the front portions or tips 64 of the jaws 62, causing the jaws 62 to retract into the chuck body 54 and compress the spring 86 between the pusher 58 and the spindle 18 (FIG. 5). The retracting jaws 62 slide along the oblique slots 66 in the chuck body 54 such that the tips 64 of the jaws 62 move away from each other or diverge from the central axis 22. This provides clearance for inserting the tool bit 28 between the jaws 62. Once there is sufficient clearance between the jaws 62 to accommodate the diameter of the tool bit 28, the tool bit 28 slides into the chuck assembly 26 (FIG. 6). Accordingly, tool bits 28 of various sizes may be quickly inserted into the chuck assembly 26 without requiring any adjustments to the chuck assembly 26.

Once the tool bit 28 slides into the chuck assembly 26 and between the jaws 62, the spring 86 moves the pusher 58 and the jaws 62 forward slightly until the exterior surfaces 65 of the jaws 62 contact the interior surface 102 of the wedge 98, applying a slight clamping force to the tool bit 28. Next, the user rotates the tightening sleeve 94 in the tightening direction, causing the tightening sleeve 94 to translate with respect to the chuck body 54 in the direction of arrow B. The clamping surface 110 of the tightening sleeve 94 bears against the exterior surface 106 of the wedge 98, causing the wedge 98 to also move slightly in the direction of arrow B. As the wedge 98 moves in the direction of arrow B, the interior surface 102 of the wedge 98 bears against the exterior surfaces 65 of the jaws 62 to increase the clamping force on the tool bit 28. In the illustrated embodiment, the user need only rotate the tightening sleeve 94 about 90 degrees to securely clamp the tool bit 28.

To release the tool bit 28, the user rotates the tightening sleeve 94 in the loosening direction, thereby moving the sleeve 94 in the direction of arrow A. As the sleeve 94 moves, a rear wall of the recess 130 bears against the retaining ring 122 on the wedge 98. Accordingly, the wedge 98 moves with the tightening sleeve 94 in the direction of arrow A to release the clamping force exerted on the tool bit 28 through the wedge 98 and the jaws 62. The user then grasps the tool bit 28 and withdraws it from the chuck assembly 26. Once the end of the tool bit 28 clears the tips 64 of the jaws 62, the spring 86 moves the pusher 58 and the jaws 62 forward, in the direction of arrow A. The exterior surfaces 65 of the jaws 62 bear against the interior surface 102 of the wedge 98, causing the tips 64 of the jaws 62 to converge on the axis 22 until the jaws 62 reach the extended position (FIG. 2).

FIGS. 7-13 illustrate a chuck assembly 226 according to another embodiment. This embodiment employs much of the same structure and features as the embodiment of the chuck assembly the chuck assembly 26 described above in connection with FIGS. 1-6. Accordingly, the following description focuses primarily upon the structure and features that are different than the embodiment described above in connection with FIGS. 1-6. Reference should be made to the description above in connection with FIGS. 1-6 for additional information regarding the structure and features, and possible alternatives to the structure and features of the chuck assembly 226 illustrated in FIGS. 7-13 and described below. In addition, elements of the chuck assembly 226 that are the same as or similar to elements of the chuck assembly 26 described with regard to FIGS. 1-6 are assigned reference numerals based on the reference numerals for FIGS. 1-6 plus 200.

Figure 7:
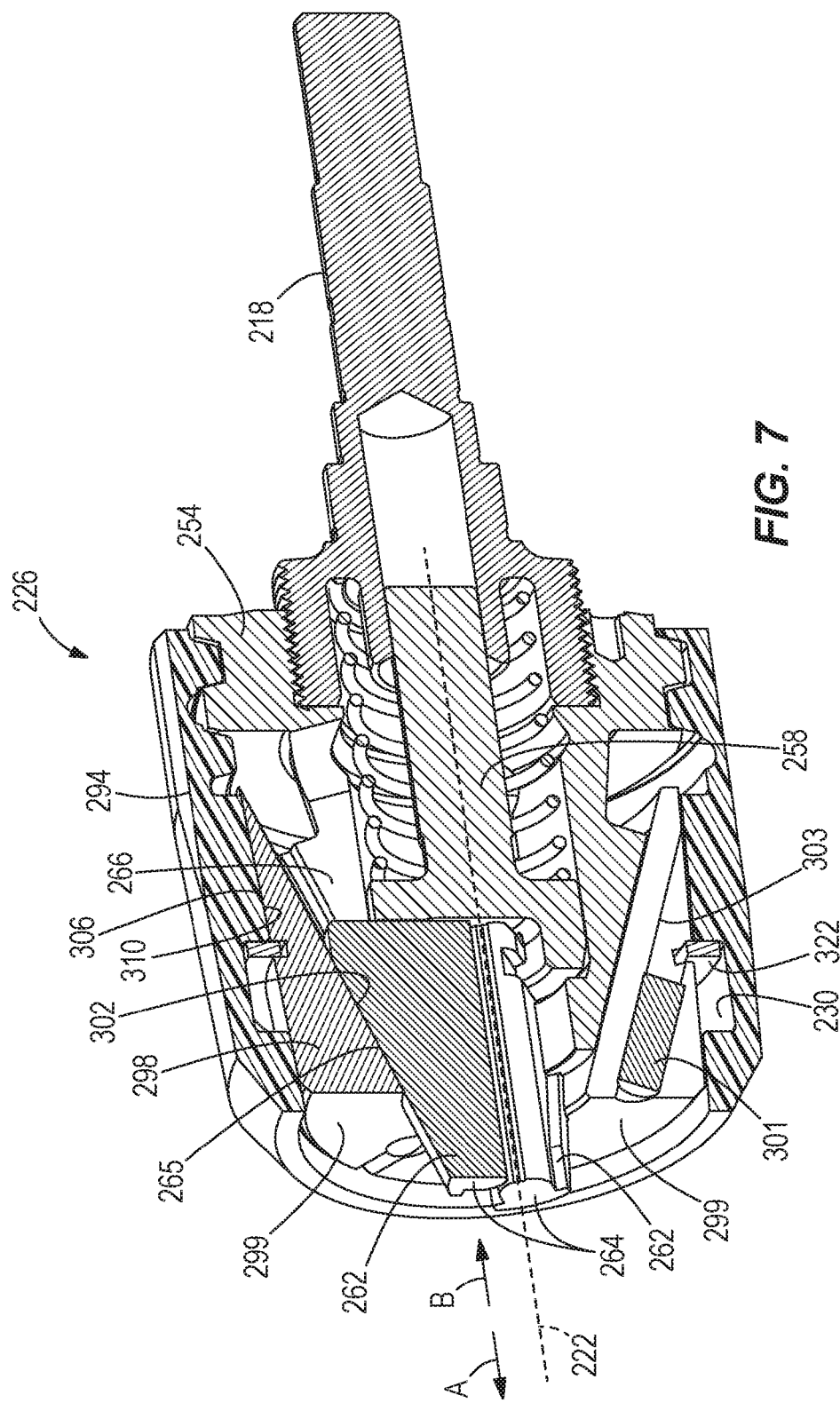
FIG. 7 is a cross-sectional view of a chuck assembly according to another embodiment of the invention.

Referring to FIG. 7, the chuck assembly 226 includes a chuck body 254 coupled for co-rotation with a spindle 218 of a rotary power tool. The chuck assembly 226 further includes a pusher 258 received within the chuck body 254 and a plurality of jaws 262, each having a front portion or tip 264 and an oblique outer surface 265 extending rearward from the tip 264. The respective jaws 262 are received in slots 266 in the chuck body 254 that are oriented at an oblique angle relative to a central axis 222.

Figure 8:
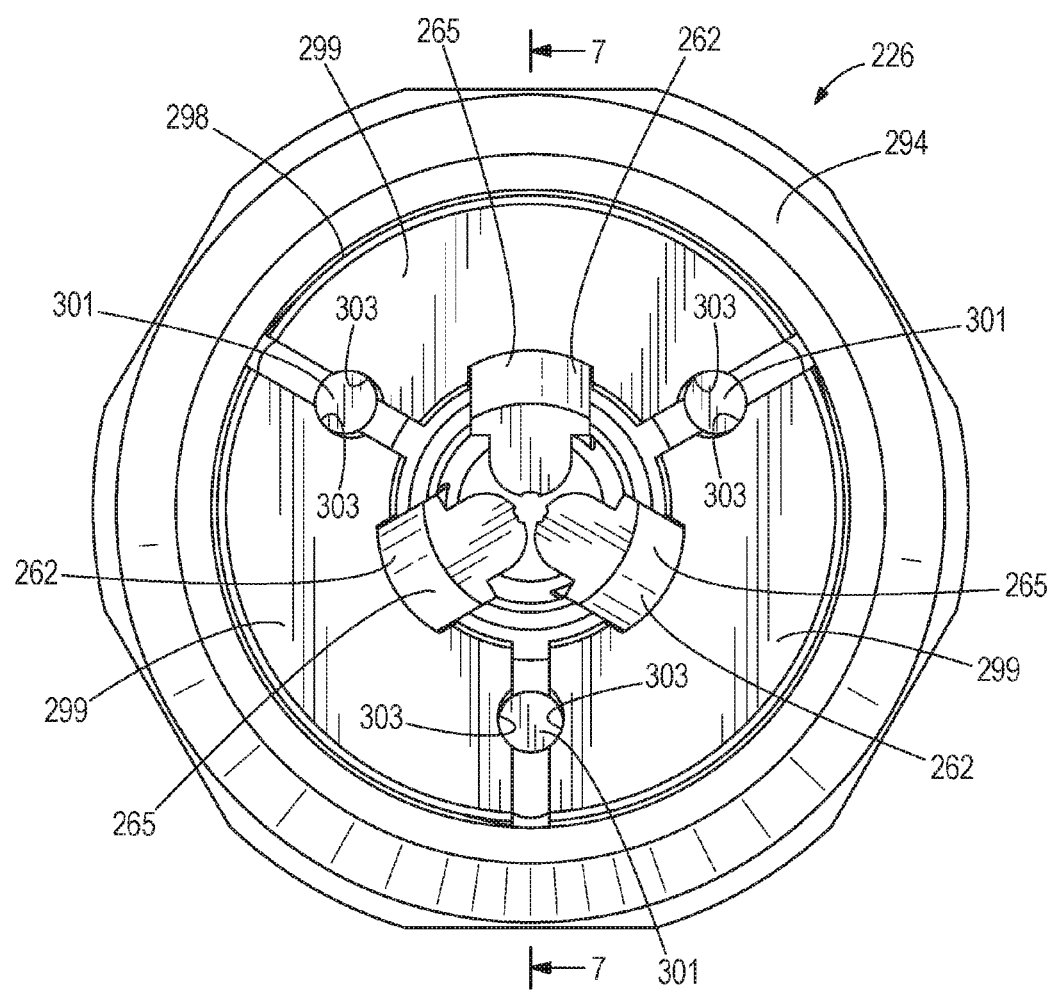
FIG. 8 is a front view of the chuck assembly of FIG. 7.

The chuck assembly 226 also includes a tightening sleeve 294 surrounding the chuck body 254 and a wedge 298 disposed between the tightening sleeve 294 and the jaws 262. In the illustrated embodiment, the wedge 298 includes three curved wedge portions 299 interconnected by elastomeric or rubber slugs 301 (FIGS. 8 and 9). The slugs 301 are received in grooves 303 located on opposed sides of the respective wedge portions 299. The slugs 301 may be compressed between adjacent wedge portions 299 such that the slugs 301 bias the wedge portions 299 radially outward and into engagement with the tightening sleeve 294.

Each of the wedge portions 299 includes a track 304 (FIG. 9) having an interior surface 302 engageable with the outer surface 265 of a corresponding one of the jaws 262 (FIG. 8). Each of the wedge portions 299 also includes an exterior surface 306 (FIG. 9) engageable with a corresponding frusto-conical interior clamping surface 310 of the tightening sleeve 294 (FIGS. 7, 11, and 13).

With reference to FIG. 10, the interior surface 302 of each of the wedge portions 299 defines a first included angle $\theta 1$, and the exterior surface 306 of each of the wedge portions 299 defines a second included angle $\theta 2$ that is less than the first included angle $\theta 1$. As described in greater detail below, this geometry enables the chuck assembly 226 to exert a relatively large clamping force on a tool bit (not shown) while maintaining a relatively compact size.

Referring to FIGS. 11-13, the tightening sleeve 294 has internal threads 314 engaged with external threads 318 of the chuck body 254 (FIG. 11). The illustrated threads 314, 318 have a trapezoidal or acme profile; however, other thread profiles may be used. Rotation of the tightening sleeve 294 relative to the chuck body 254 in a first or tightening direction causes axial displacement of the tightening sleeve 294 along the chuck body 254 in the direction of arrow B, thereby applying a clamping force to the jaws 262 through the wedge portions 299. Conversely, rotation of the tightening sleeve 294 relative to the chuck body 254 in a second or loosening direction causes axial displacement of the tightening sleeve 294 along the chuck body 254 in the direction of arrow A.

In the illustrated embodiment, the tightening sleeve 294 includes a spiral groove 319 (FIGS. 12 and 13) extending along the root of the tightening sleeve threads 314. A detent 321 located on the chuck body 254 is received in the spiral groove 319 to limit rotation of the tightening sleeve 294 relative to the chuck body 254 in the loosening direction. The detent 321 may be spring biased into engagement with the groove 319. As the tightening sleeve 294 is rotated, the detent 321 slides along the groove 319. When the tightening sleeve 294 is fully-loosened as illustrated in FIG. 12, the detent 321 engages an end of the spiral groove 319 to inhibit further loosening of the tightening sleeve 294. Accordingly, the tightening sleeve 294 cannot be completely unthreaded from the chuck body 254.

With reference to FIGS. 7 and 10, the wedge portions 299 resolve an axial force, resulting from axial displacement of the sleeve 294, into a normal or clamping force exerted by each of the jaws 262 on a tool bit. In general, the smaller the included angles $\theta 1$ and $\theta 2$, the greater the clamping force exerted on the tool bit. A relatively steep angle $\theta 1$, however, allows for a shorter, more compact chuck assembly 226. In other words, the greater the first included angle $\theta 1$, the less axial distance is required for the jaws 262 to fully extend or retract. Therefore, a tradeoff exists between the developed clamping force and the length of the chuck assembly 226.

In the illustrated embodiment, the first included angle $\theta 1$ is about 40 degrees, and the second included angle $\theta 2$ is about 6 degrees. It has been found through extensive design, calculations, and testing that this geometry provides a relatively large clamping force while maintaining a compact length of the chuck assembly 226. In other embodiments, the first included angle θ1 may be between about 30 degrees and about 50 degrees, and the second included angle θ2 may be between about 2 degrees and about 10 degrees.

To apply a clamping force to a tool bit inserted between the jaws 262, a user rotates the tightening sleeve 294 in the tightening direction, causing the tightening sleeve 294 to translate with respect to the chuck body 254 in the direction of arrow B (FIG. 7). The clamping surface 310 of the tightening sleeve 294 bears against the exterior surfaces 306 of the wedge portions 299, causing the wedge 298 to also move slightly in the direction of arrow B. As the wedge 298 moves in the direction of arrow B, the interior surfaces 302 on the tracks 304 bear against the exterior surfaces 265 of the jaws 262 to increase the clamping force on the tool bit.

To release the tool bit, the user rotates the tightening sleeve 294 in the loosening direction, thereby moving the sleeve 294 in the direction of arrow A. As the sleeve 294 moves, a rear wall of a recess 230 in the sleeve 294 bears against a retaining ring 322 circumscribing the wedge portions 299. Accordingly, the wedge 298 moves with the tightening sleeve 294 in the direction of arrow A to release the clamping force exerted on the tool bit through the wedge portions 299 and the jaws 262. The detent 321 prevents the tightening sleeve 294 from being completely unthreaded from the chuck body 254 (FIG. 12).

FIGS. 14-23 illustrate a chuck assembly 426 according to another embodiment. This embodiment employs much of the same structure and features as the embodiment of the chuck assembly 26 and the chuck assembly 226 described above in connection with FIGS. 1-6 and FIG. 7-13, respectively. Accordingly, the following description focuses primarily upon the structure and features that are different than the embodiments described above in connection with FIGS. 1-13. Reference should be made to the description above in connection with FIGS. 1-13 for additional information regarding the structure and features, and possible alternatives to the structure and features of the chuck assembly 426 illustrated in FIGS. 14-23 and described below. In addition, elements of the chuck assembly 426 that are the same as or similar to elements of the chuck assembly 26 described with regard to FIGS. 1-6 or the chuck assembly 226 described with regard to FIGS. 7-13 are assigned reference numerals based on the reference numerals for FIGS. 1-6 plus 400.

Figure 14:
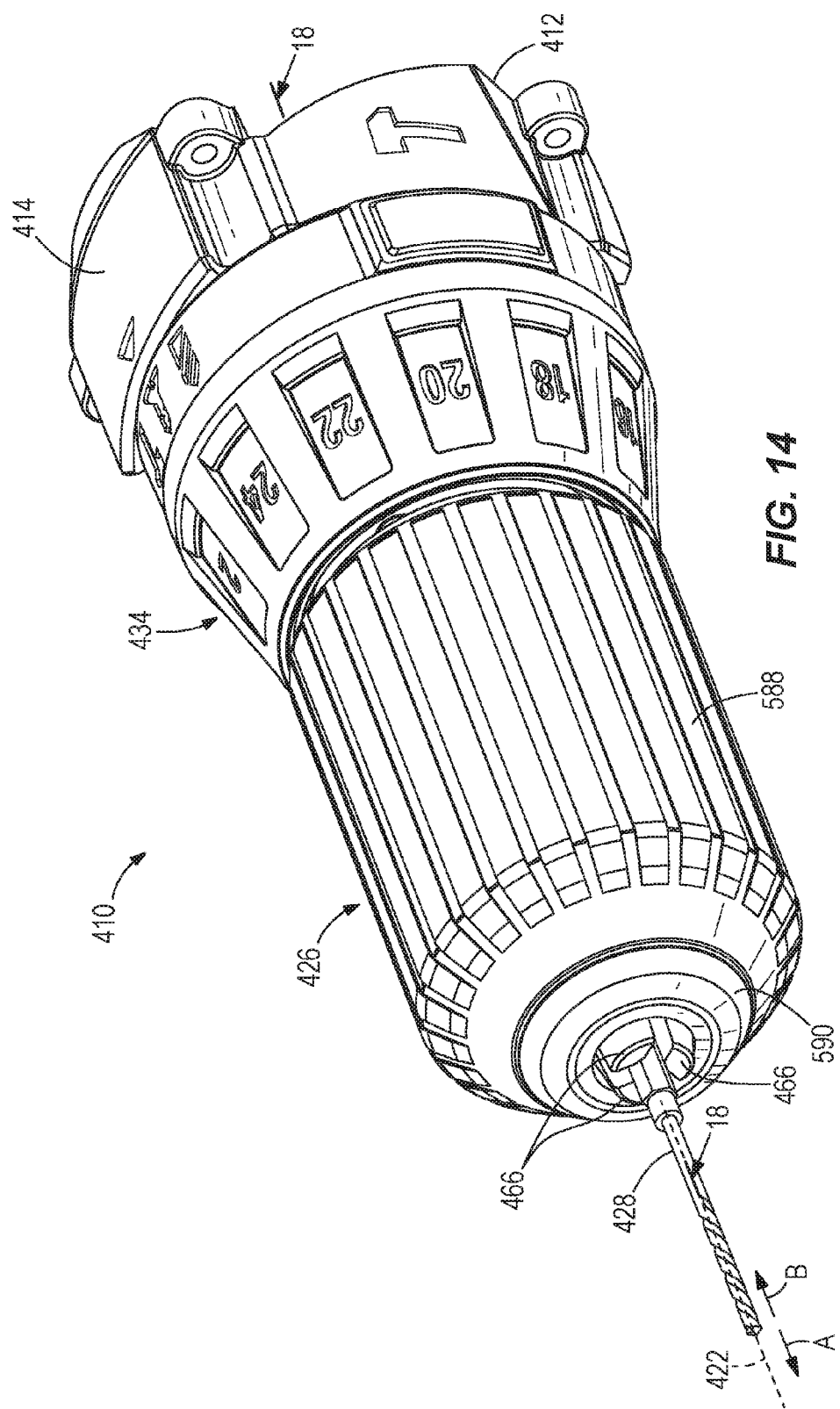
FIG. 14 is a perspective view of a front end assembly of a power tool including a chuck assembly according to another embodiment of the invention.

FIG. 14 illustrates a front end assembly 410 for use with a rotary power tool 412 (e.g., a hammer drill, etc.). The front end assembly 410 includes a housing 414, a spindle 418 (FIG. 15) supported within the housing 414 and rotatable about a central axis 422, and a chuck assembly 426 (FIG. 14) for selectively receiving and retaining a tool bit 428. The tool bit 428 is insertable within the chuck assembly 426 along the central axis 422 in a rearward direction B and removable from the chuck assembly 426 in a forward direction A. In the illustrated embodiment, the tool bit 428 is a drill bit, but in other embodiments, the tool bit 428 may be other types of rotary tool bits (e.g., an impact driver drill or driver bit). The spindle 418 (FIG. 15) is coupled to an output of a transmission (not shown), such as a multi-speed, planetary transmission, and receives torque from an electric motor (not shown) of the rotary power tool 412. In the illustrated embodiment, an adjustable clutch mechanism 434 (FIG. 14) selectively limits the amount of torque that may be transferred from the transmission to the spindle 418.

Figure 16:
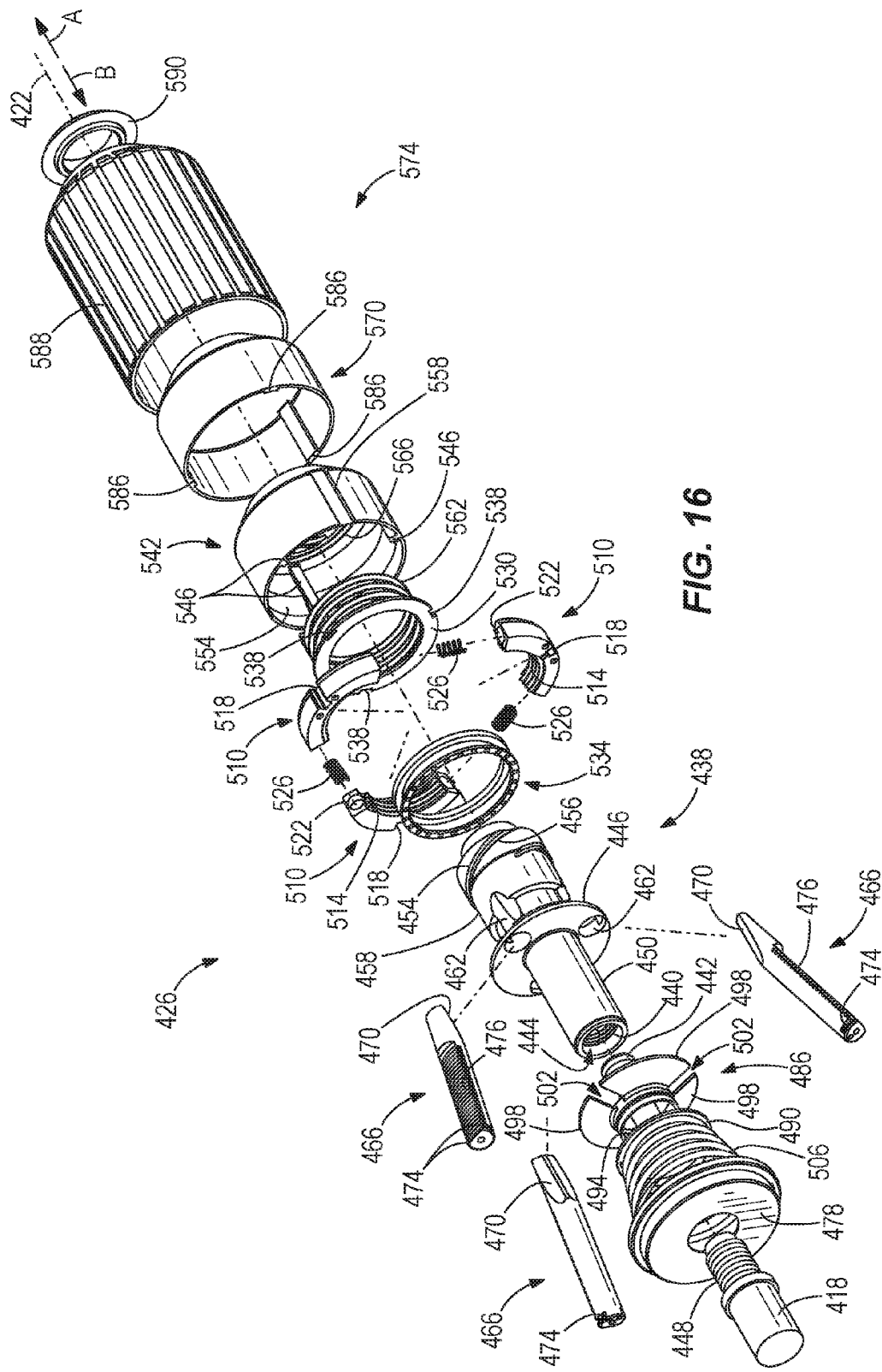
FIG. 16 is an exploded rear view of the chuck assembly of FIG. 14.
Figure 17:
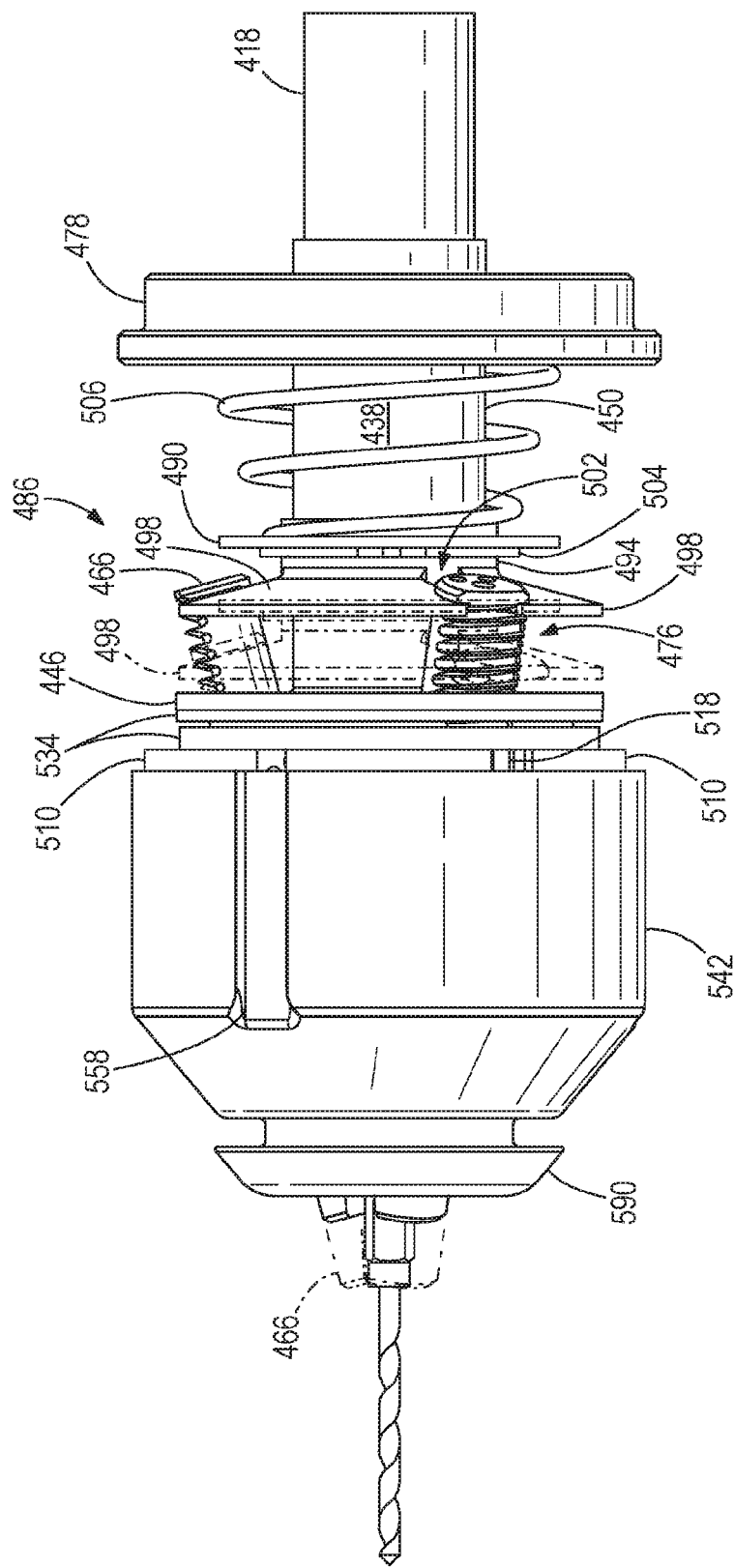
FIG. 17 is a side view of the chuck assembly of FIG. 14, with portions removed, illustrating jaws in a retracted position and, in phantom, an extended position.

With reference to FIG. 16, the chuck assembly 426 includes a chuck body 438 having a threaded portion 440 with which a threaded portion 448 of the spindle 418 is engaged. In the illustrated embodiment of the chuck assembly 426, a plug 442 is interference fit to both a central bore 444 of the chuck body 438 and an interior portion of the spindle 418, thereby unitizes the spindle 418 to the chuck body 438 for co-rotation. In other words, the interference fit created by the plug 442 prevents the chuck body 438 from inadvertently unthreading from the spindle 418 while the tool 412 is in use. In other embodiments, the plug 442 may be a screw that is threaded into the spindle 418 to fix the chuck body 438 and the spindle 418 together. Alternatively, the chuck body 438 and the spindle 418 may be effectively unitized for co-rotation in a different manner.

Figure 15:
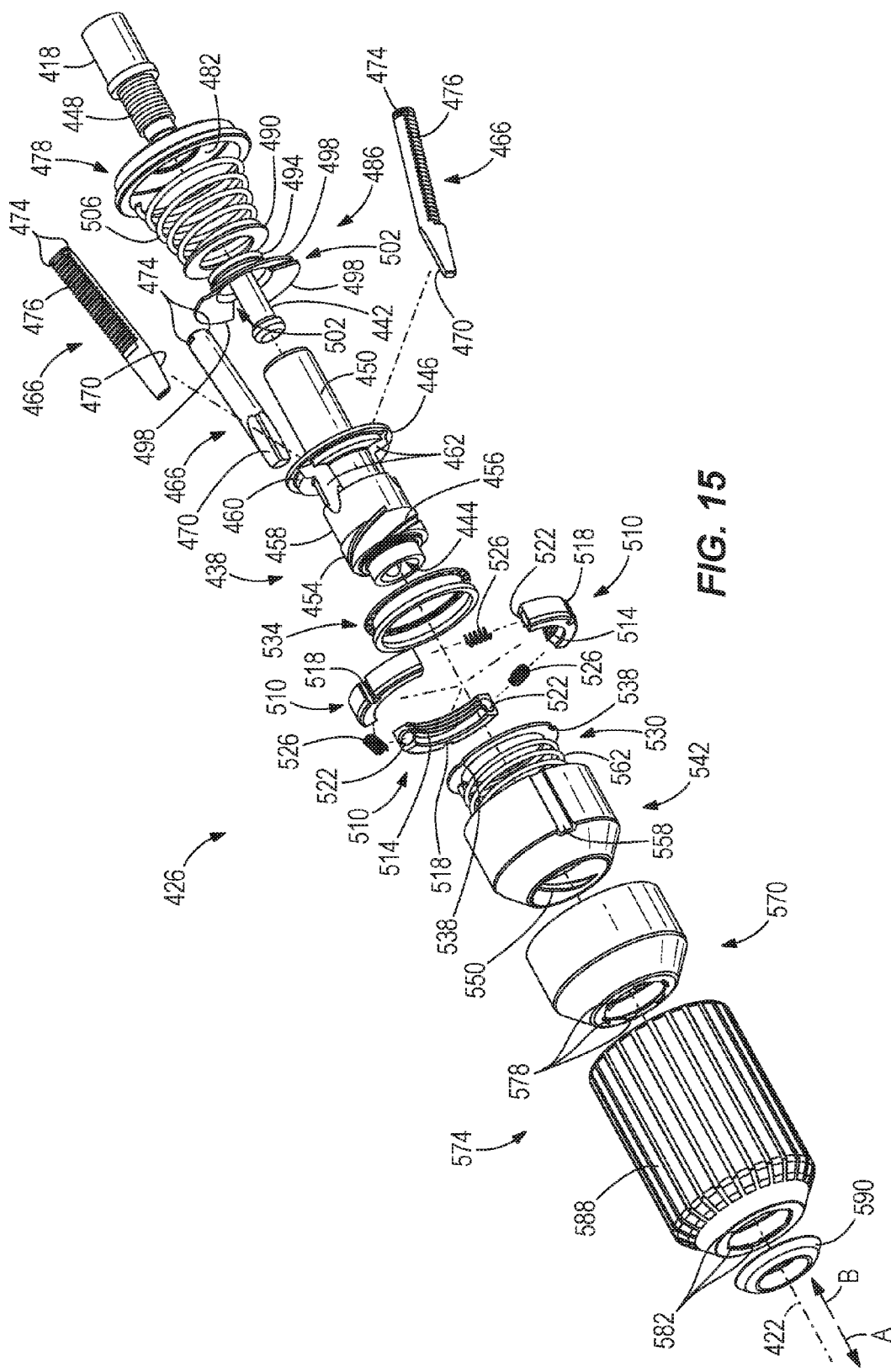
FIG. 15 is an exploded front view of the chuck assembly of FIG. 14.

With reference to FIG. 15, the chuck body 438 also includes an annular wall 446 adjacent a shank portion 450, a first outer peripheral portion 454 proximate the front end of the chuck body 438, and a second outer peripheral portion 458 between the first outer peripheral portion 454 and the annular wall 446. The annular wall 446 includes an annular bearing seat portion 460. The first outer peripheral portion 454 includes external threads 456 (FIG. 20), which are discontinued proximate an interface between the first outer peripheral portion 454 and the second outer peripheral portion 458. Stated another way, the second outer peripheral portion 458 does not include threads. With reference to FIGS. 15 and 16, the chuck body 438 also includes a plurality of passageways 462 extending from the central bore 444 and through the annular wall 446. In the illustrated embodiment of the chuck assembly 426, the chuck body 438 includes three passageways 462 that are equi-angularly spaced around a periphery of the chuck body 438 (i.e., by about 120 degrees).

Figure 23A:
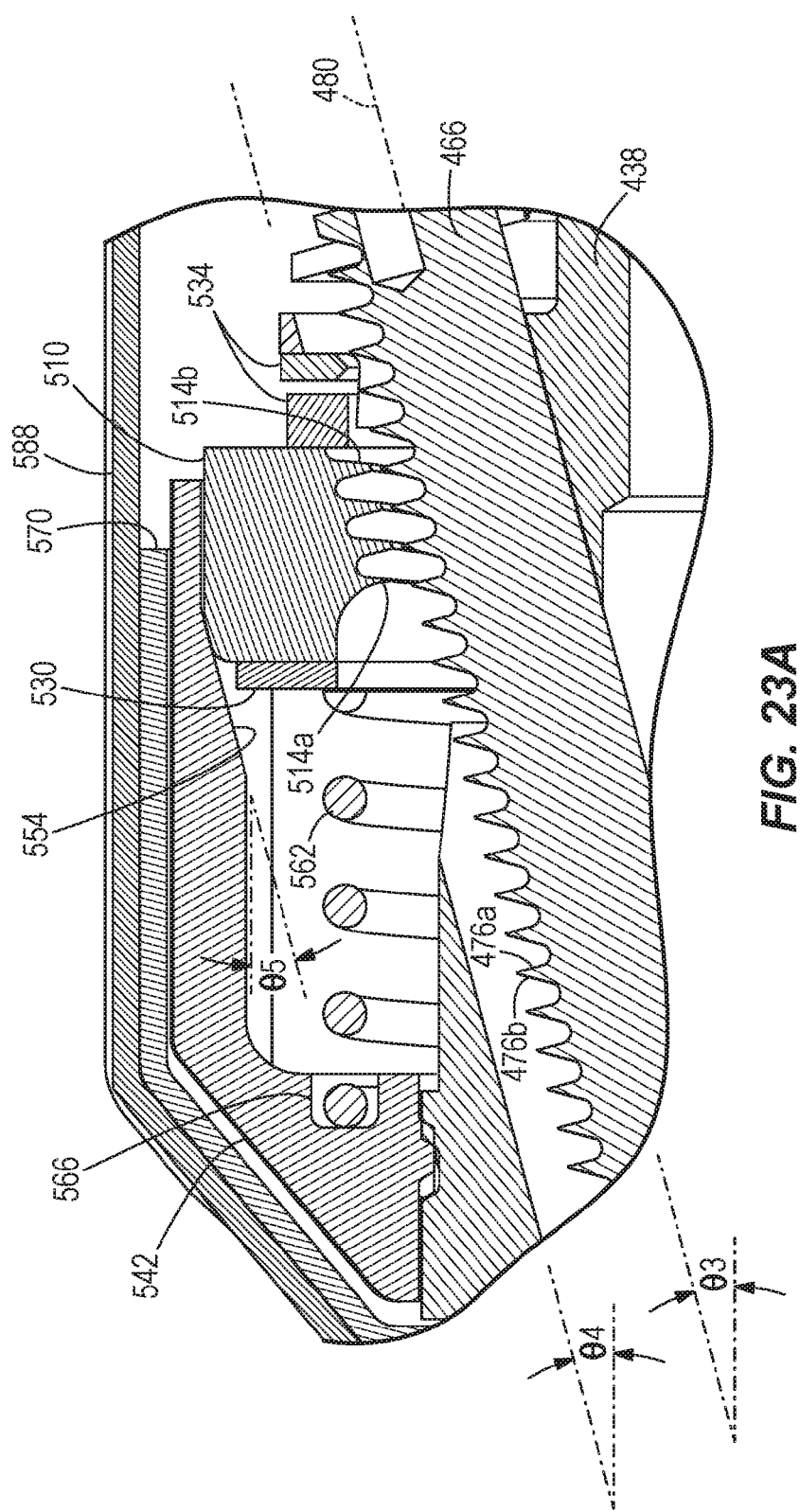
FIG. 23A-23C are enlarged cross-sectional views of the chuck assembly illustrating a sequence of the chuck assembly being adjusted from the unlocked configuration to the locked configuration.

The chuck assembly 426 also includes jaws 466 received through the respective passageways 462. Each of the jaws 466 includes a gripping portion 470 adjacent the front end of the jaw 466, opposed radial grooves 474 adjacent the rear end of the jaw 466, and threads 476 extending between the gripping portion 470 and the grooves 474. In illustrated embodiment of the chuck assembly 426, the threads 476 on each of the jaws 466 are configured as double-start buttress threads. In other words, each tooth of a buttress thread is defined by a substantially normal (e.g., perpendicular) side 476a and an oblique side 476b (FIG. 23A). For example, the normal side 476a of each of the threads is substantially perpendicular to a longitudinal axis 480 of the jaw 466, whereas the oblique side 476b is oriented at an oblique angle relative to the longitudinal jaw axis 480. In other embodiments, the threads 476 may be differently configured as, for example, single-start threads or triple-start threads. With continued reference to FIG. 23A, the jaws 466 are oriented at an angle θ3 relative to the central axis 422, the significance of which is explained in greater detail below.

Figure 18:
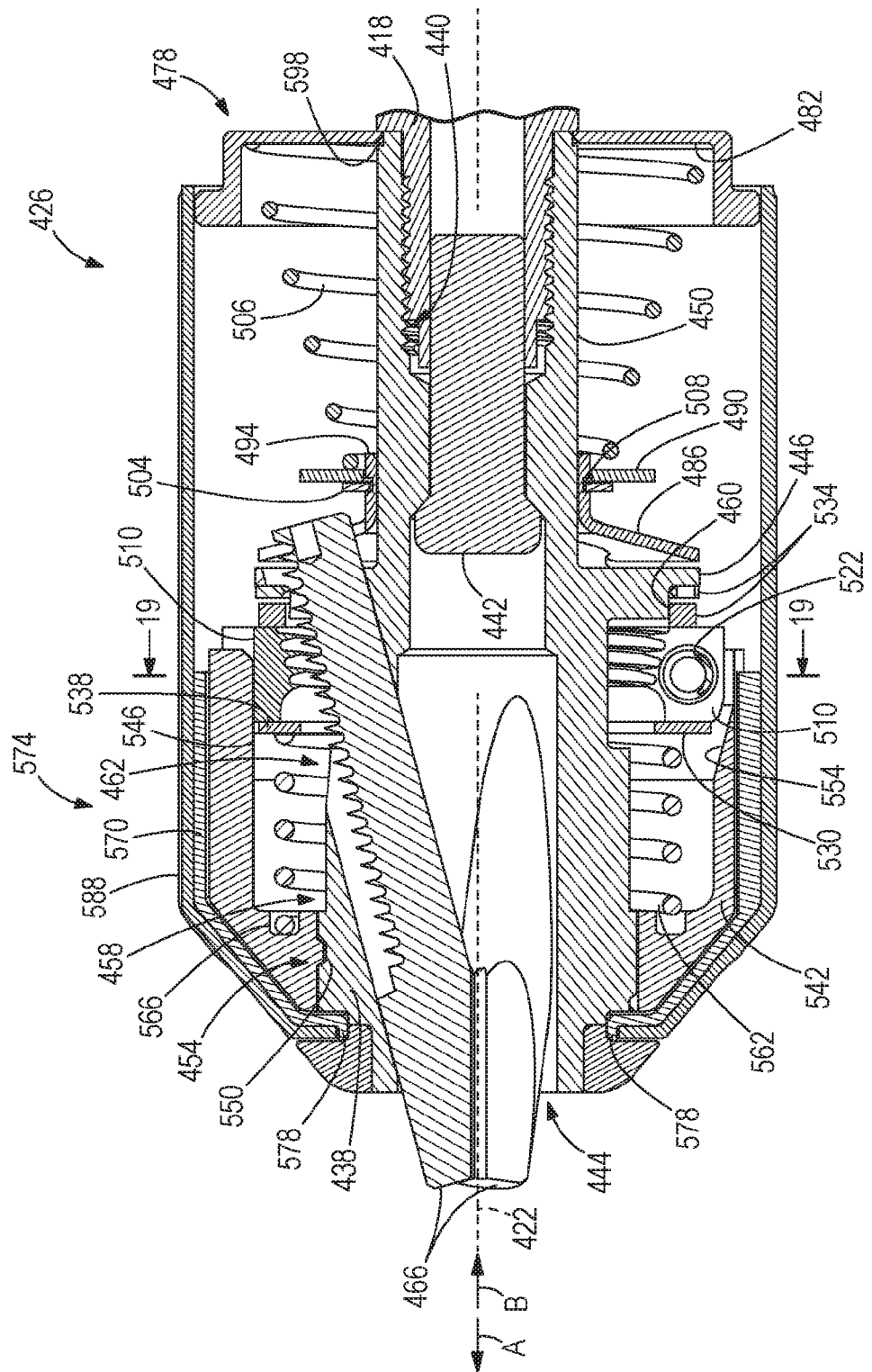
FIG. 18 is a cross-sectional view taken along line 18-18 of FIG. 14 with the chuck assembly in an unlocked configuration and the jaws in the extended position.

With reference to FIGS. 15 and 18, the chuck assembly 426 further includes an end cap 478 fixed to the chuck body 438 and the spindle 418 for co-rotation therewith. In particular, the end cap 478 is clamped between spaced, parallel flanges on the chuck body 438 and the spindle 418, respectively. The end cap member 478 includes a surface 482 that faces the annular wall 446 of the chuck body 438 (FIG. 18). The chuck assembly 426 also includes a jaw retainer 486 having an annular portion 494 slidably received on the shank portion 450 and flanges 498 extending from the annular portion 494. The flanges 498 define a corresponding number of slots 502, each of which is sized to slidably receive a reduced thickness portion of a jaw 466 defined by between the opposed grooves 474. Accordingly, the jaws 466 are slidable along the slots 502 as the jaw retainer 486 slides along the shank portion 450 of the chuck body 438. A retaining clip 504 is seated within an annular groove 508 (FIG. 18) in the annular portion 494 of the jaw retainer 486, and a first washer 490 is seated against the retaining clip. A first biasing member (i.e., coil spring 506) is positioned between the surface 482 of the end cap member 478 and the first washer 490 to bias the first washer 490, and ultimately the jaw retainer 486, in the forward direction A (FIG. 15).

Alternatively, the first biasing member may be configured as a plurality of coil springs that are equi-angularly spaced from each other about the central axis 422. In further embodiments, the first biasing member may be configured as a garter spring. In this embodiment, the jaw retainer 486 could be omitted (thereby shortening the overall length of the chuck assembly 426), and the garter spring would circumscribe the rear of the jaws 466 to exert a radially inward-directed force on each of the jaws 466. Due to the geometry of the passageways 462, a component of the radial force is resolved in the forward direction A, thereby biasing the jaws 466 towards the central axis 422 and the extended position.

Figure 19:
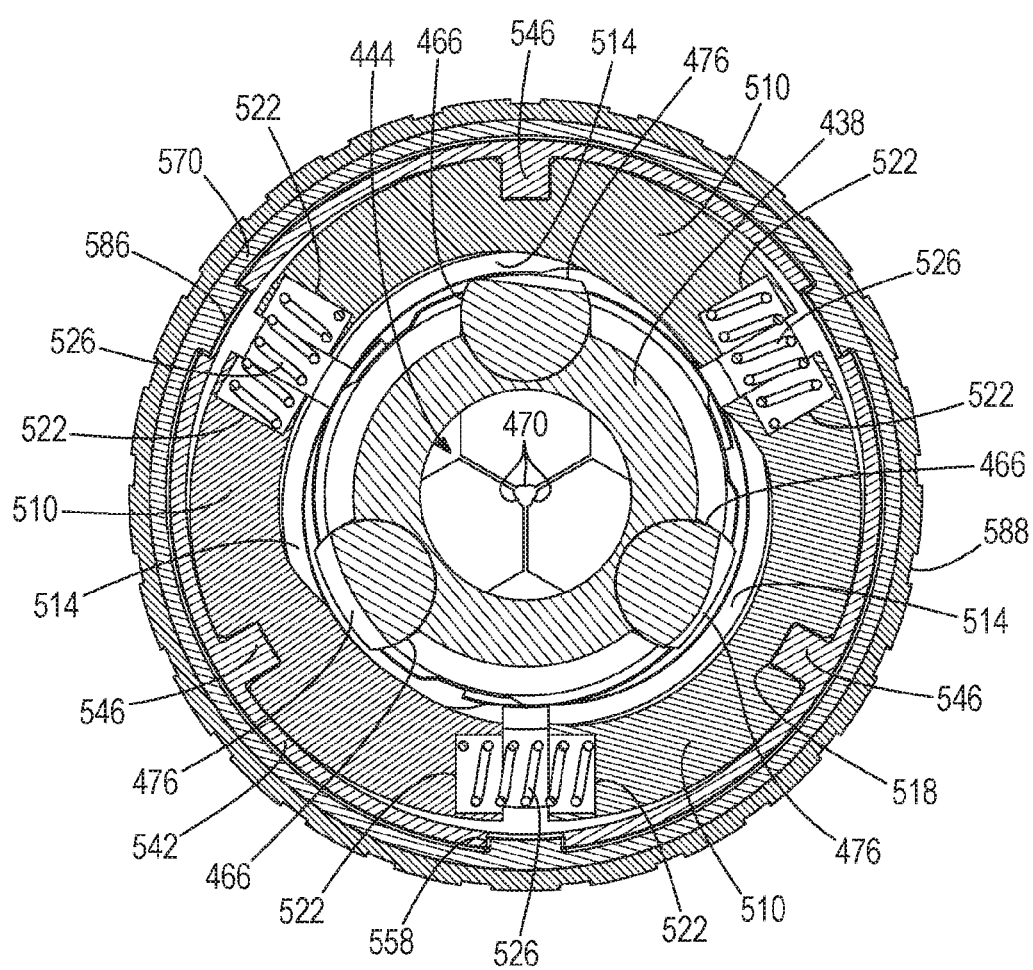
FIG. 19 is a cross-sectional view taken along line 19-19 of FIG. 18 illustrating clamping nuts in an expanded position disengaged from the jaws.
Figure 20:
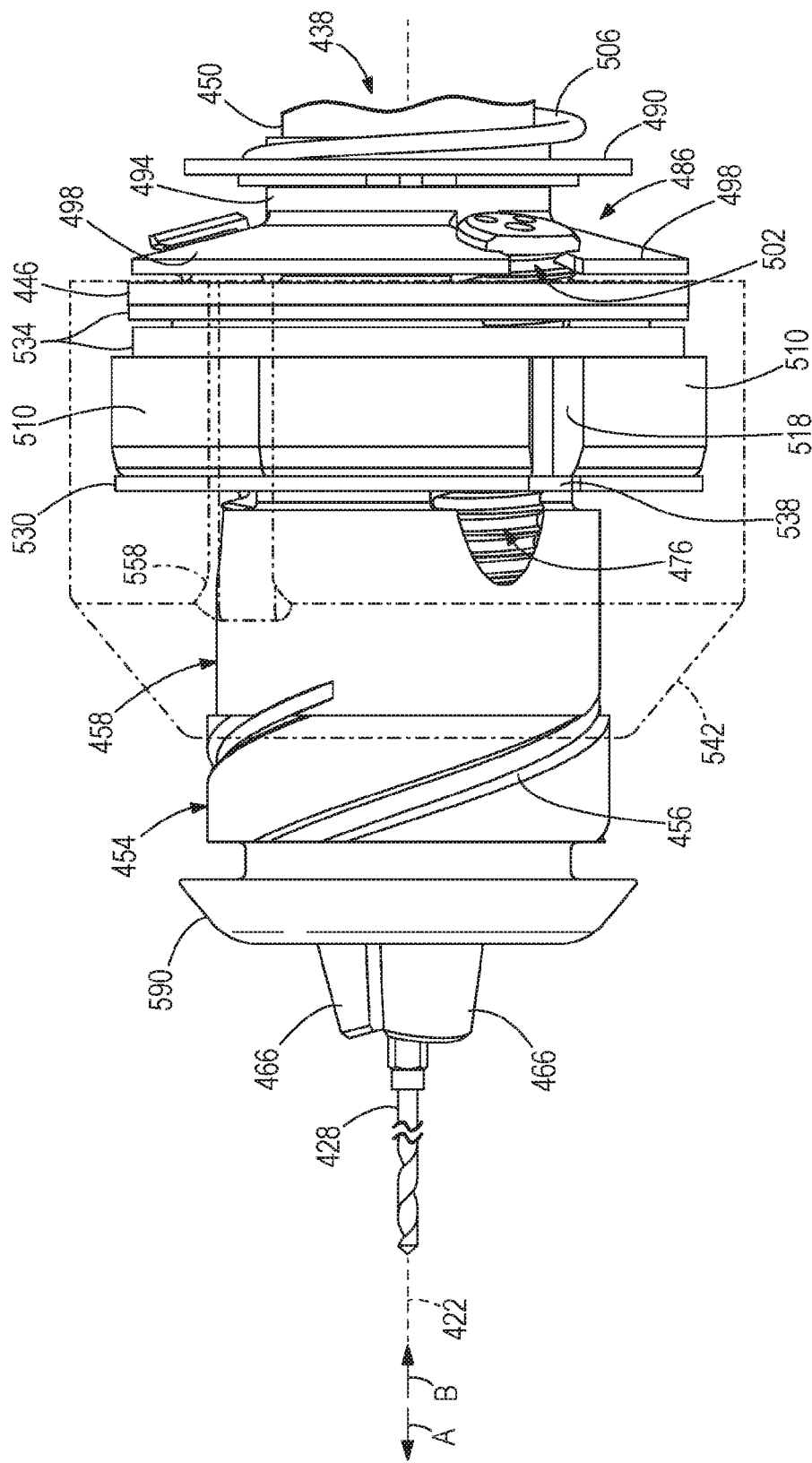
FIG. 20 is a side view of the chuck assembly of FIG. 14, with portions removed, illustrating the chuck assembly in a locked configuration with a tool bit secured between the jaws.

With reference to FIGS. 15 and 16, the chuck assembly 426 further includes a plurality of clamping nuts 510 each having interior threads 514, an axial keyway 518, and cavities 522. In the illustrated embodiment, three clamping nuts 510 are biased radially outward relative to the central axis 422 by springs 526. Each spring 526 is seated within a respective cavity 522 of adjacent clamping nuts 510 (FIG. 19). With reference to FIGS. 15 and 16, the keyways 518 are defined on an exterior surface of the respective clamping nuts 510. Similar to the threads 476 on each of the jaws 466, the threads 514 on each of the clamping nuts 510 are double-start buttress threads. Accordingly, each tooth of the threads 514 includes a normal side 514a and an oblique side 514b relative to the longitudinal axis of the jaw 466. Because the threads 514, 476 are also configured as double-start threads, the jaws 466 are axially displaced a distance of twice the pitch of the threads 476 for each revolution of the clamping nuts 510. With reference to FIG. 23A, the threads 514 are generally oriented at an angle θ4 relative to the central axis 422, whereby the angle θ3 and the angle θ4 are substantially equal.

With reference to FIGS. 15 and 16, the chuck assembly 426 also includes a second washer 530 and a thrust bearing 534 in abutting relationship with opposite sides of the clamping nuts 510, respectively, with the thrust bearing 534 located between the clamping nuts 510 and the annular wall 446. The thrust bearing 534 is positioned on the annular bearing seat portion 460 and is configured to allow relative rotational movement between the clamping nuts 510 and the chuck body 438 while reducing frictional forces therebetween. The second washer 530 includes a corresponding number of keyways 538 (FIG. 16) that are sized similar to and in alignment with the keyways 518 in the clamping nuts 510.

The chuck assembly 426 also includes a tightening sleeve 542 having keys 546 and internal threads 550 (FIG. 15) located on an interior portion thereof. The internal threads 550 are engageable with the external threads 456 of the first outer peripheral portion 454. The keys 546 are sized for a snug sliding fit with the keyways 518, 538. In other embodiments, the keys 546 may include a different geometry to appropriately mate with the keyways 518, 538 in the clamping nuts 510 and the washer 530, respectively. With reference to FIG. 18, the tightening sleeve 542 also includes an annular wedge portion 554 extending around the entire interior periphery of the tightening sleeve 542. The wedge portion 554 defines an oblique angle θ5 relative to the central axis 422 (FIG. 23A). In the illustrated embodiment of the chuck assembly 426, the angle θ5 is less than the angles θ3, θ4. The tightening sleeve 542 also includes axial keyways 558 located on an outer periphery thereof. In the illustrated embodiment, there are three keyways 558 equi-angularly spaced about the outer periphery of the tightening sleeve 542. Alternatively, the tightening sleeve 542 may include more or fewer than three keyways 558 on its outer periphery. The chuck assembly 426 also includes a second biasing member (i.e., coil spring 562) seated within a groove 566 proximate a front end of the tightening sleeve 542, and the opposite end of the spring is abutted with the second washer 530. The spring 562 is preloaded during all times of operation of the chuck assembly 426 to bias the second washer 530, the clamping nuts 510, and the thrust bearing 534 in the rearward direction B (FIG. 15).

With reference to FIGS. 15 and 16, the chuck assembly 426 further includes an outer sleeve 574, having an insert portion 570 and an outer portion 588, received on the tightening sleeve 542. The insert portion 570 is fixed for co-rotation with the outer portion 588 by mating projections 578 and slots 582 formed in the insert portion 570 and the outer portion 588, respectively. Alternatively, the insert portion 570 and the outer portion 588 may be integrally formed as one piece. The insert portion 570 includes keys 586 (FIG. 16) equi-angularly spaced about the central axis 422 and are sized to engage the respective keyways 558 in the tightening sleeve 542. The outer portion 588 of the outer sleeve 574 includes a ribbed surface to enhance gripping by the user. In other embodiments, the outer portion 588 may include a textured surface (e.g., a knurled surface) to enhance gripping by the user. The chuck assembly 426 also includes a front retaining cap 590 interference fit to the front of the chuck body 438 to thereby clamp the outer sleeve 574 between the cap 590 and an annular flange 598 (FIG. 18) on the chuck body 438 to inhibit movement of the outer sleeve 574 in both the forward direction A and the rearward direction B.

In operation, the chuck assembly 426 is adjustable between an unlocked configuration (FIGS. 18 and 19), in which a tool bit 428 is insertable between the jaws 466, and a locked configuration (FIGS. 20-22), in which the tool bit 428 is clamped between the jaws 466. In the unlocked configuration of the chuck assembly 426 shown in FIG. 18, the tightening sleeve 542 is located in a forward position with the internal threads 550 of the tightening sleeve 542 engaged with the external threads 456 on the first outer peripheral portion 454 of the chuck body 438. As such, the wedge portion 554 is disengaged from the clamping nuts 510, providing sufficient radial clearance for the clamping nuts 510 to radially expand within the tightening sleeve 542 under the bias of the springs 526 (FIG. 19). The amount of radial clearance is sufficient to maintain the threads 514 of the clamping nuts 510 disengaged from the threaded portion 476 of the respective jaws 466. In addition, the washer 530 and the clamping nuts 510 are biased axially against the thrust bearing 534 by the spring 562 applying (FIG. 18).

With continued reference to FIG. 18, in the unlocked configuration of the chuck assembly 426, the jaw retainer 486 and the jaws 466 are biased in the forward direction A by the spring 506, causing the gripping portions 470 to be in an abutting relationship. Stated another way, in the unlocked configuration of the chuck assembly 426, the jaws 466 default to an extended position.

To insert a tool bit 428 into the chuck assembly 426, a user needs only to push the jaws 466 toward a retracted position within the chuck body 438 (shown in FIG. 17), against the bias of the spring 506, using the shank of the tool bit 428 itself. As the jaws 466 are retracted within their respective apertures 462, the jaw retainer 486 is also slid rearward on the shank portion 450 in unison with the jaws 466. While the jaw retainer 486 is slid rearward, the jaws 466 are slidable radially outward within the slots 502 to create a gap between the gripping portions 470 of the respective jaws 466. This movement of the jaws 466 and jaw retainer 486 continues until the gap is sufficiently large to accept the shank of the tool bit 428, after which time the spring 506 rebounds to displace the jaws 466 toward their extended positions to lightly grasp the tool bit 428. As such, the tool bit 428 is initially and lightly clamped between the gripping portions 470 of the respective jaws 466 under the force applied by the spring 506. However, the initial clamping force applied to the tool bit 428 at this time is sufficiently weak to permit the tool bit 428 to be removed and replaced with a different tool bit 428 without requiring the jaws 466 to move to their retracted position.

In addition, the initial clamping force applied to the tool bit 428 by the jaws 466 and the spring 506 facilitates self-alignment of tool bits having a hexagonal shank between the gripping portions 470. Specifically, when inserting a tool bit having a hexagonal shank into the chuck assembly 426, an unstable condition naturally results if the gripping portions 470 engage the corners of the hexagonal shank because the spring 506 exerts a preload on the jaws 466, a component of which is applied to the tool bit shank as the initial clamping force described above. This instability and application of the initial clamping force on the tool bit shank causes the hexagonal shank of the tool bit to rotate incrementally until the flats, rather than the corners, of the tool bit shank engage the gripping portions 470.

Once the tool bit 428 is in position and lightly clamped by the jaws 466 as described above, the chuck assembly 426 is adjusted to the locked configuration by rotating the outer sleeve 574 in a tightening direction which, in turn, also rotates the tightening sleeve 542 in the same direction. Due to engagement of the threads 550, 456 on the tightening sleeve 542 and the first outer peripheral portion 454, respectively, the tightening sleeve 542 is also translated in the rearward direction B until the threads 550, 456 disengage proximate an interface between the first and second outer peripheral portions 454, 458 of the chuck body 438. During translation of the tightening sleeve 542 in the rearward direction B, the wedge portion 554 engages the clamping nuts 510 to radially contract the clamping nuts 510 within the tightening sleeve 542 (against the bias of the springs 526) until the threads 514 of the clamping nuts 510 become engaged with the threads 476 on the jaws 466.

Figure 21:
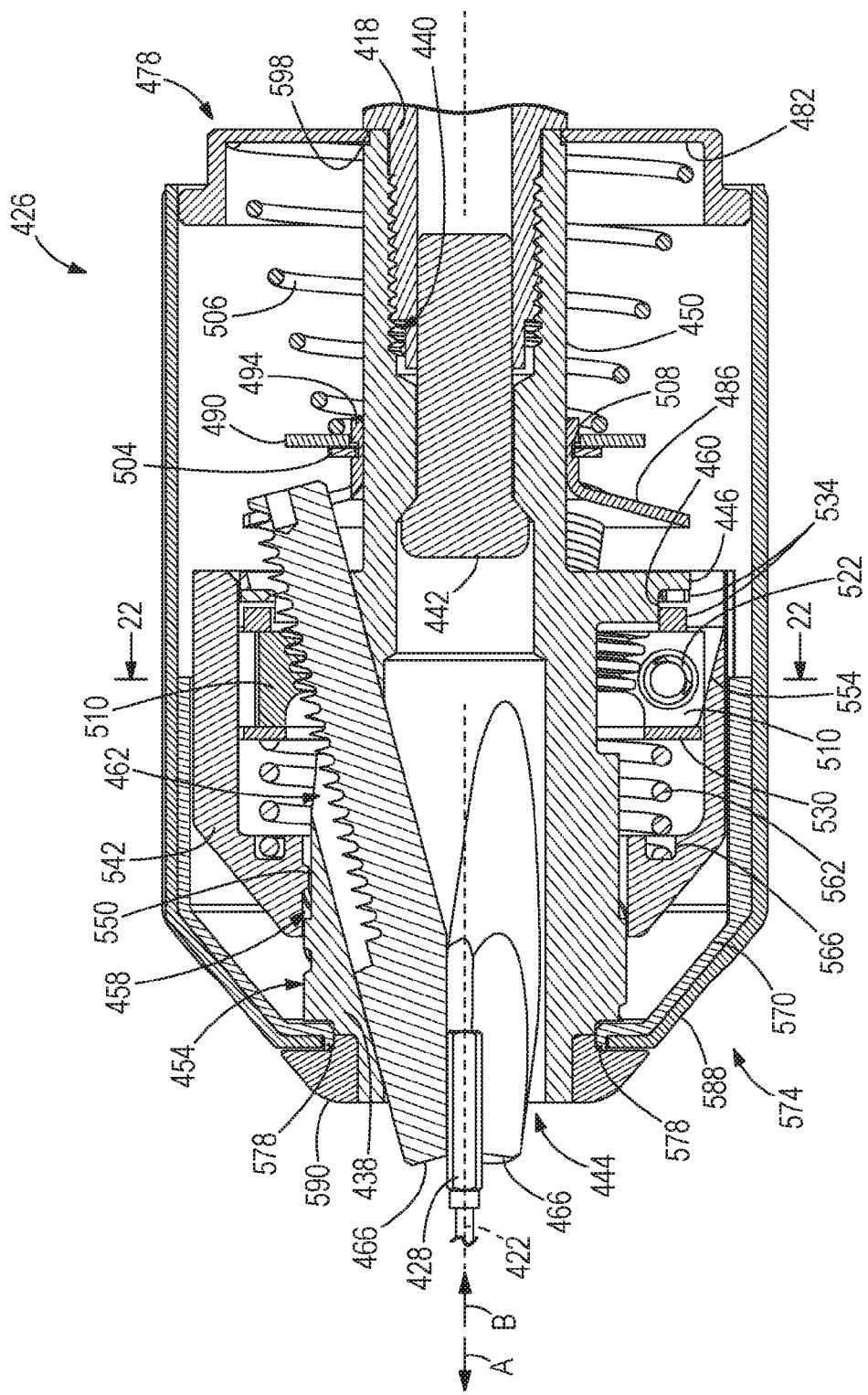
FIG. 21 is a cross-sectional view taken along line 18-18 of FIG. 14 with the chuck assembly in the locked configuration with a tool bit secured between the jaws.
Figure 22:
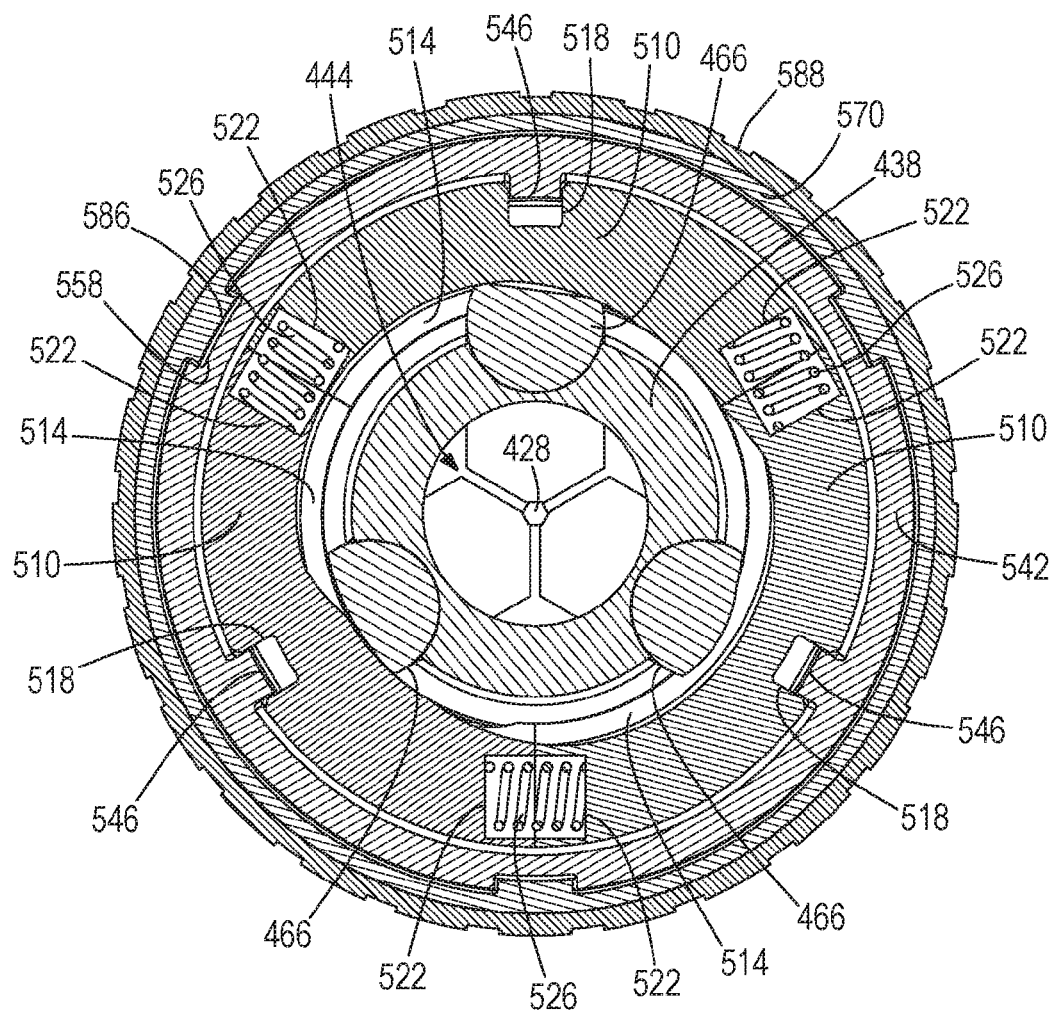
FIG. 22 is a cross-sectional view taken along line 22-22 of FIG. 21 with the clamping nuts in a contracted position engaging the jaws.

Shortly thereafter, because the external threads 456 are discontinued proximate the interface between the first and second outer peripheral portions 454, 458 (FIG. 20), further translation of the tightening sleeve 542 in the rearward direction B is halted even though the outer sleeve 574 and the tightening sleeve 542 may continue to be rotated. In the illustrated embodiment of the chuck assembly 426, translation of the tightening sleeve 542 in the rearward direction ceases when the wedge portion 554 has moved past the clamping nuts 510 as shown in FIG. 21, thereby inhibiting further radial contraction of the clamping nuts 510 onto the jaws 466. Continued rotation of the outer sleeve 574 and the tightening sleeve 542 in the tightening direction displaces the jaws 466 toward their extended positions, increasing the clamping force applied to the tool bit 428 for securing the tool bit 428 within the chuck assembly 426.

Figure 23B:
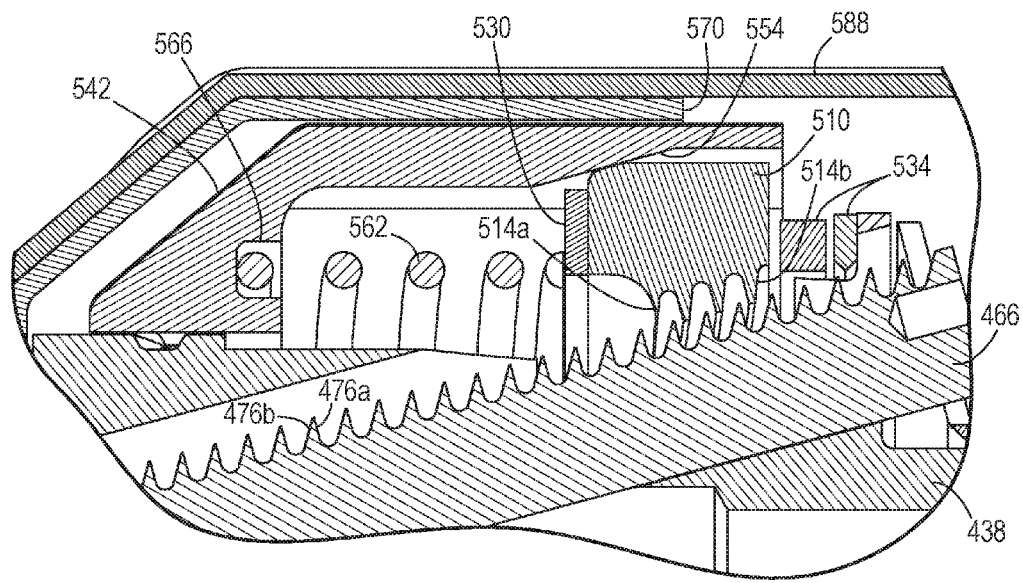
Figure 23C:
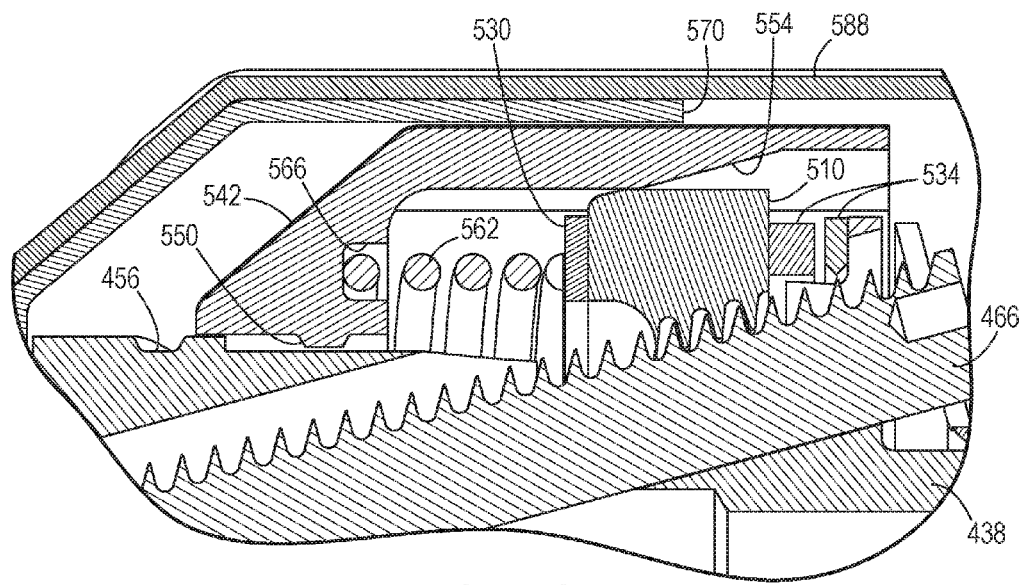

As illustrated in FIG. 23A, while the clamping nuts 510 are being radially contracted around the jaws 466, the tips of the clamping nut threads 514 and the tips of the jaw threads 476 could jam and prevent the clamping nuts 510 from properly engaging the jaws 466 while remaining seated against the thrust bearing 534. However, because the threads 514 on the clamping nuts 510 and the individual threads in the threaded portions 476 of the respective jaws 466 are configured as buttress threads and the angle θ5 defined by the wedge portion 554 is less than the angle θ3 of the jaws, rather than becoming jammed, the clamping nuts 510 may slip in the forward direction A relative to the jaws 466 against the biasing force of the spring 562, opening a gap between the clamping nuts 510 and the thrust bearing 534 (FIG. 23B). Thereafter, continued rotation of the outer sleeve 574 and the tightening sleeve 542 in the tightening direction causes the clamping nuts 510 to rotate relative to the jaws 466 and close the gap between the clamping nuts 510 and the thrust bearing 534. Once the gap is closed as shown in FIG. 23C, continued rotation of the outer sleeve 574 and the tightening sleeve 542 in the tightening direction displaces the jaws 466 toward their extended positions, increasing the clamping force applied to the tool bit 428 for securing the tool bit 428 within the chuck assembly 426.

To loosen the jaws 466 and return the chuck assembly 426 to the unlocked configuration, the outer sleeve 574 and the tightening sleeve 542 are rotated in an opposite loosening direction, thereby partially retracting the jaws 466 and relieving the clamping force applied to the tool bit 428. As rotation of the outer sleeve 574 and the tightening sleeve 542 in the loosening direction continues, the spring 562 urges the tightening sleeve 542 toward the first outer peripheral portion 454 of the chuck body 438, causing the threads 550, 456 to re-engage. As rotation continues, the tightening sleeve 542 is translated in the forward direction A, permitting the clamping nuts 510 to radially expand as the wedge portion 554 moves past the clamping nuts 510 in the forward direction A toward the position shown in FIG. 18. Upon the clamping nuts 510 reaching the radially expanded position shown in FIGS. 18 and 19, the threads 514, 476 are disengaged, once again permitting the user to replace the tool bit 428 with a different tool bit 428 in the manner described above.

Various features of the invention are set forth in the following claims.

What is claimed is:

1. A method of operating a chuck assembly for use with a rotary power tool, the method comprising:
   inserting a tool bit within a central bore of a chuck body, the bore defining a rotational axis;
   displacing a plurality of jaws with the tool bit, from an extended position to a retracted position, during insertion of the tool bit within the central bore;
   biasing the jaws, from the retracted position toward the extended position, after insertion of the tool bit within the central bore with a first spring;
   rotating a tightening sleeve about the rotational axis in a tightening direction, imparting an axial displacement to the tightening sleeve relative to the chuck body;
   inwardly displacing a plurality of clamping nuts in a radial direction in response to engagement between a wedge defined on the tightening sleeve and the clamping nuts, causing respective threads on the clamping nuts and the jaws to engage; and
   applying a clamping force on the tool bit with the jaws in response to continued rotation of the tightening sleeve in the tightening direction.

2. The method of claim 1, wherein, after engagement of the respective threads on the clamping nuts and the jaws, applying the clamping force on the tool bit by continued rotation of the tightening sleeve in the tightening direction and displacement of the jaws toward the extended position.

3. The method of claim 2, wherein imparting an axial displacement to the tightening sleeve further includes threadably engaging the tightening sleeve with a first outer peripheral portion of the chuck body.

4. The method of claim 3, further comprising moving the tightening sleeve from the first outer peripheral portion to a second outer peripheral portion of the chuck body to stop the axial displacement of the tightening sleeve.

5. The method of claim 4, wherein moving the tightening sleeve to the second outer peripheral portion prevents over-tightening of the clamping nuts on the jaws.

6. The method of claim 4, wherein engaging the tightening sleeve with a first outer peripheral portion of the chuck body includes engaging external threads on the chuck body with internal threads on the tightening sleeve.

7. The method of claim 6, wherein moving the tightening sleeve from the first outer peripheral portion to a second outer peripheral portion of the chuck body includes disengaging the internal threads on the tightening sleeve from the external threads on the chuck body proximate an interface between the first outer peripheral portion and the second outer peripheral portion of the chuck body.

8. The method of claim 7, wherein moving the tightening sleeve from the second outer peripheral portion to the first outer peripheral portion of the chuck body includes re-engaging the internal threads on the tightening sleeve with the external threads on the chuck body proximate the interface between the first outer peripheral portion and the second outer peripheral portion of the chuck body.

9. The method of claim 2, further comprising:
rotating the tightening sleeve about the rotational axis in an opposite, loosening direction; and
releasing the clamping force on the tool bit.

10. The method of claim 9, wherein rotating the tightening sleeve in either the tightening direction or the loosening direction also rotates the clamping nuts in the tightening direction or the loosening direction, respectively.

11. The method of claim 9, further comprising outwardly displacing the clamping nuts in the radial direction in response to rotation of the tightening sleeve in the loosening direction, causing the respective threads on the clamping nuts and jaws to disengage.

12. The method of claim 11, wherein outwardly displacing the clamping nuts further includes biasing the clamping nuts in a radial direction with a clamping nut spring positioned between adjacent clamping nuts.

13. The method of claim 1, further comprising biasing the clamping nuts in a rearward direction along the rotational axis with a second spring.

14. The method of claim 1, wherein displacing the jaws from the extended position to the retracted position further includes maintaining a position of the clamping nuts relative to the chuck body during displacement of the jaws from the extended position to the retracted position.

15. The method of claim 14, further comprising compressing the first spring in response to displacement of the jaws from the extended position to the retracted position.

16. The method of claim 1, wherein rotating the tightening sleeve about the rotational axis in the tightening direction further includes rotating an outer sleeve coupled for co-rotation with the tightening sleeve.

17. The method of claim 16, further comprising translating the tightening sleeve along the rotational axis in response to rotation of the outer sleeve about the rotational axis.

18. The method of claim 17, further comprising translating the tightening sleeve along the rotational axis relative to the outer sleeve in response to rotation of the outer sleeve about the rotational axis.

19. The method of claim 16, further comprising coupling the tightening sleeve for co-rotation with the outer sleeve using a key positioned on one of the tightening sleeve or the outer sleeve, and a keyway defined in the other of the tightening sleeve or the outer sleeve.

20. The method of claim 19, further comprising sliding the key within the keyway in response to the tightening sleeve being translated along the rotational axis relative to the outer sleeve, in response to rotation of the outer sleeve about the rotational axis.

* * * * *